US009467945B2

(12) United States Patent
Diachina et al.

(10) Patent No.: US 9,467,945 B2
(45) Date of Patent: Oct. 11, 2016

(54) METHODS PROVIDING ASSIGNMENT MESSAGES AND RELATED MOBILE STATIONS AND BASE STATION SUBSYSTEMS

(71) Applicant: TELEFONAKTIEBOLAGET L M ERICSSON (PUBL), Stockholm (SE)

(72) Inventors: John Walter Diachina, Garner, NC (US); Ravitej Ballakur, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/312,511

(22) Filed: Jun. 23, 2014

(65) Prior Publication Data
US 2014/0369280 A1 Dec. 18, 2014

Related U.S. Application Data

(63) Continuation-in-part of application No. 13/765,378, filed on Feb. 12, 2013.

(60) Provisional application No. 61/599,591, filed on Feb. 16, 2012, provisional application No. 61/862,593, filed on Aug. 6, 2013.

(51) Int. Cl.
| H04J 3/14 | (2006.01) |
| H04W 52/02 | (2009.01) |
| H04W 74/08 | (2009.01) |
| H04W 74/00 | (2009.01) |

(52) U.S. Cl.
CPC ..... *H04W 52/0229* (2013.01); *H04W 74/0833* (2013.01); *H04W 74/006* (2013.01)

(58) Field of Classification Search
CPC ............ H04W 74/0833; H04W 74/06; H04L 1/1685

USPC ......................................................... 370/329
See application file for complete search history.

(56) References Cited

U.S. PATENT DOCUMENTS

2010/0081445 A1 * 4/2010 Aghili ................... H04L 5/0053
455/450
2010/0220713 A1 * 9/2010 Tynderfeldt et al. ......... 370/350
(Continued)

FOREIGN PATENT DOCUMENTS

| EP | 2 178 321 A1 | 4/2010 |
| WO | WO 2008/156315 A2 | 12/2008 |
| WO | WO 2011/159207 A1 | 12/2011 |
| WO | WO 2012/049604 A1 | 4/2012 |

OTHER PUBLICATIONS

3GPP: 3rd Generation Partnership Project: Technical Specification Group GSM/EDGE Radio Access Network; GERAN Improvements for Machine-Type Communications (MTC) Release 12; 3GPP TR 43.868 v12.0.0 (Nov. 2012), the whole document.
(Continued)

*Primary Examiner* — Mark Rinehart
*Assistant Examiner* — Matthew Hopkins

(57) ABSTRACT

A method of operating a mobile station requesting uplink access from a base station subsystem may include transmitting an access request to the base station subsystem, and delaying looking for a response matching the access request according to a delay interval. A response time window (RTW) may be initiated after the delay interval. During the response time window, the mobile station may look for an assignment message transmitted from the base station subsystem and matching the access request without looking for an assignment message matching the access request during the delay interval.

33 Claims, 13 Drawing Sheets

(56) References Cited

U.S. PATENT DOCUMENTS

| | | |
|---|---|---|
| 2011/0038361 A1* | 2/2011 | Park et al. .................... 370/350 |
| 2011/0317636 A1 | 12/2011 | Diachina et al. |
| 2012/0093173 A1 | 4/2012 | Noh et al. |
| 2012/0213071 A1* | 8/2012 | Jokinen et al. ............... 370/232 |
| 2013/0051336 A1* | 2/2013 | Li et al. ......................... 370/329 |
| 2013/0070589 A1 | 3/2013 | Diachina et al. |

OTHER PUBLICATIONS

Ericsson, ST-Ericsson: "Energy Efficient AGCH Monitoring"; 3GPP TSG-GERAN #56; GP-121303, Prague, Czech Republic; Nov. 19-23, 2013, the whole document.

3GPP: 3rd Generation Partnership Project: Technical Specification Group GERAN; GERAN Improvements for Machine-Type Communications (MTC) Release 10; 3GPP TR 43.868 v0.5.0 (Nov. 29, 2011), the whole document.

Tdoc GP-130395, "Energy Efficient AGCH monitoring", 3GPP TSG GERAN#58, Agenda item 7.2.5.3.6, May 13-17, 2013, Xiamen, China, the whole document.

Tdoc GP-130489, "Energy Efficient AGCH Monitoring", 3GPP TSG GERAN#58, Agenda item 7.2.5.3.6, May 13-17, 2013, Xiamen, China, the whole document.

Tdoc GP-130721, "Managing the Response Time Window", 3GPP TSG GERAN#59, Agenda item 7.2.5.3.6, Aug. 26-30, 2013, Sofia Bulgaria, the whole document.

3GPP TSG-GERAN #56, "Simulations for Optimized Matching Response", GP-121304, Ericsson, ST-Ericsson, Prague, Czech Republic, Nov. 19-23, 2012, the whole document.

\* cited by examiner

Values of parameter S

| TX-Integer | Non-Combined CCCH | Combined CCCH/SDCCH |
|---|---|---|
| 3, 8, 14, 50 | 55 | 41 |
| 4, 9, 16 | 76 | 52 |
| 5, 10, 20 | 109 | 58 |
| 6, 11, 25 | 163 | 86 |
| 7, 12, 32 | 217 | 115 |

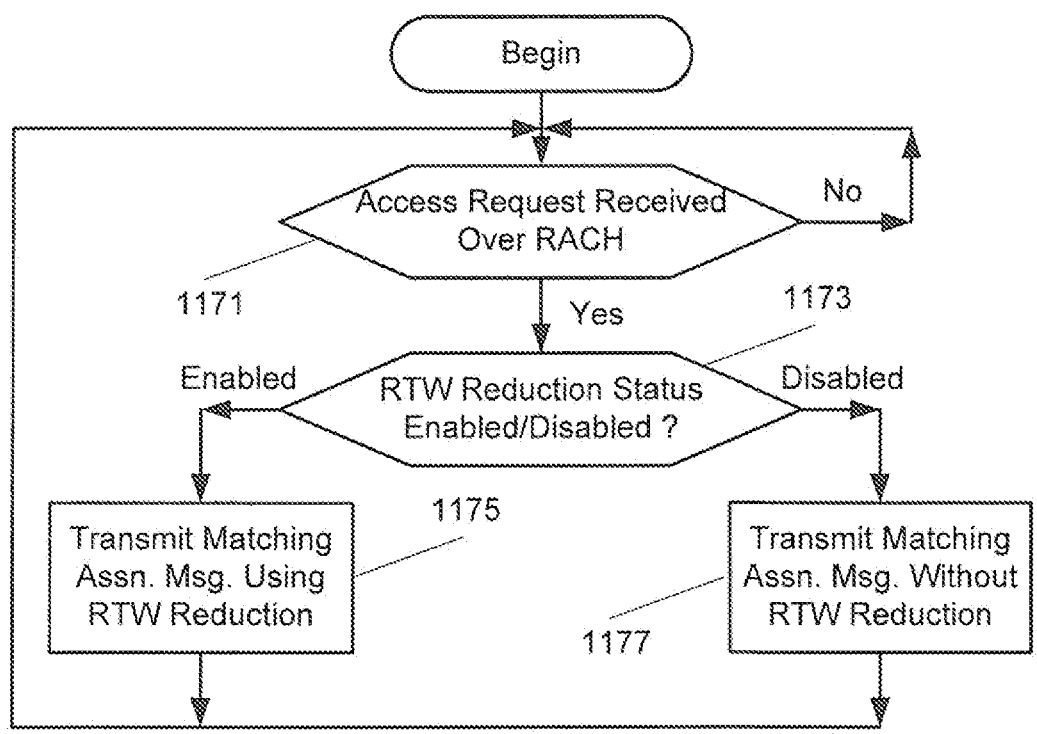

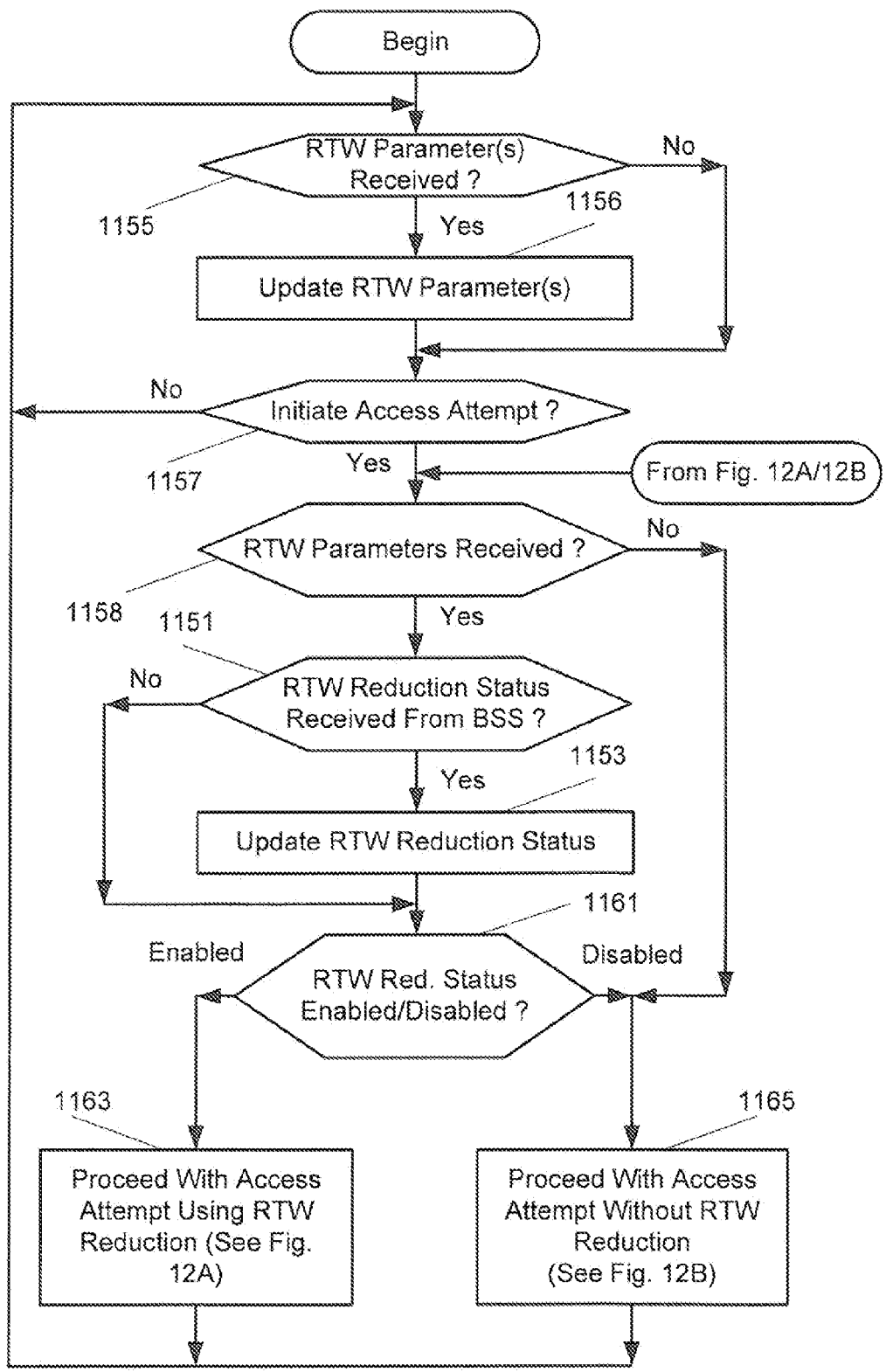

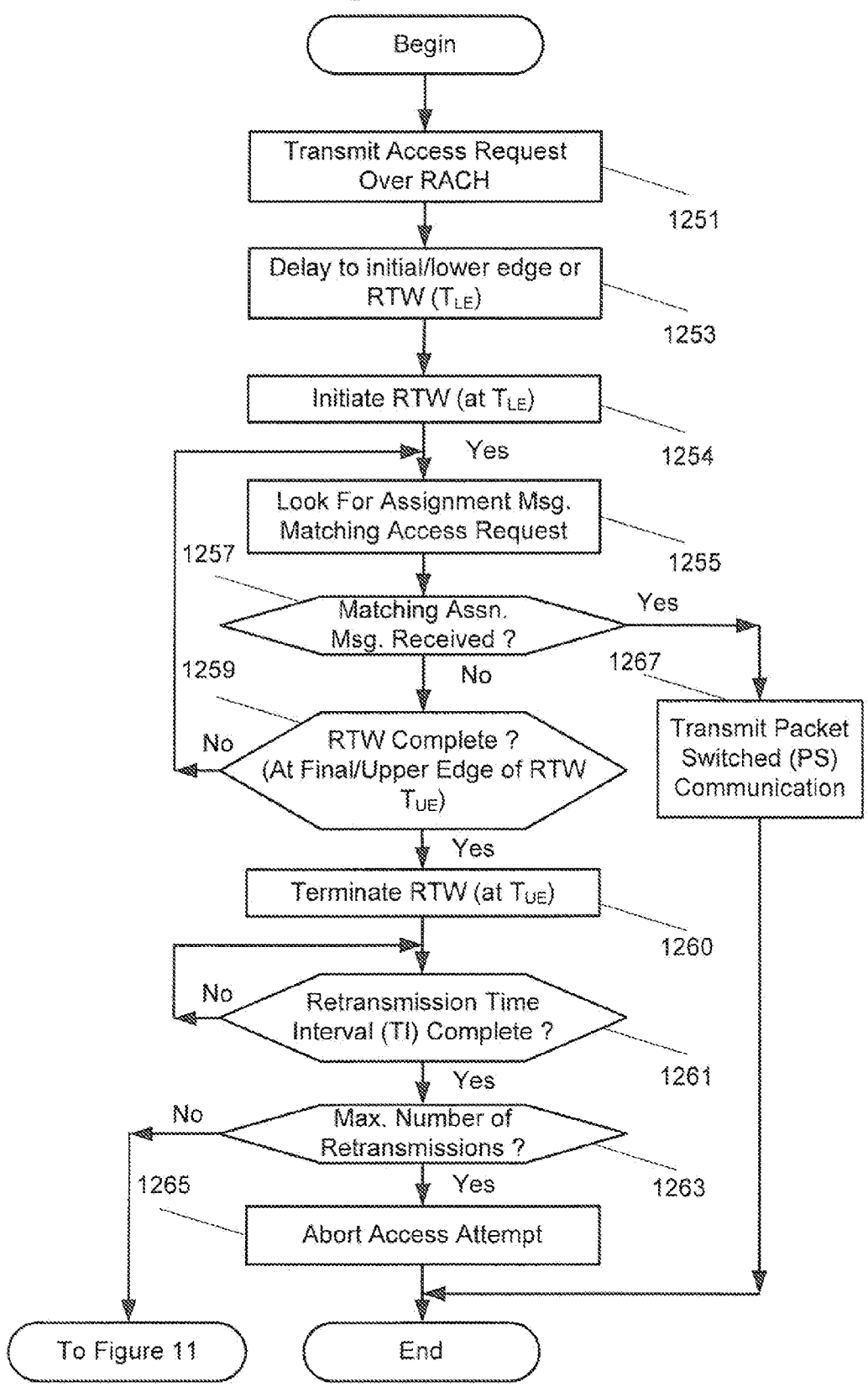

Figure 13A

| Channel Coding | Match in TI 1 | Match in TI 2 | Match in TI 3 | Match in TI 4 | Match in TI 5 |
|---|---|---|---|---|---|
| CS-1 (30 RLC data blocks) | 3.0% | 16.6% | 24.9% | 32.1% | 38.2% |
| MCS-7 (6 RLC data blocks) | 13.0% | 44.0% | 53.8% | 59.9% | 64.1% |

Table 1 - SDT Power Savings Using OPM (lower edge = 75ms,, upper edge = 200ms

Figure 13B

| Channel Coding | Match in TI 1 | Match in TI 2 | Match in TI 3 | Match in TI 4 | Match in TI 5 |
|---|---|---|---|---|---|
| CS-1 (30 RLC data blocks) | 2.0% | 11.6% | 17.1% | 22.3% | 27.0% |
| MCS-7 (6 RLC data blocks) | 8.8% | 31.1% | 36.9% | 41.6% | 45.3% |

Table 2 - SDT Power Savings Using OPM (lower edge = 50ms,, upper edge = 300ms

METHODS PROVIDING ASSIGNMENT MESSAGES AND RELATED MOBILE STATIONS AND BASE STATION SUBSYSTEMS

CROSS REFERENCE TO RELATED APPLICATIONS

The present application claims the benefit of priority as a continuation-in-part of U.S. application Ser. No. 13/765,378 filed Feb. 12, 2013, which claims the benefit of priority from U.S. Provisional Patent Application No. 61/599,591 filed Feb. 16, 2012, entitled "S, T and BSS Response Time Based MS Power Savings." The present application also claims the benefit of priority from U.S. Provisional Patent Application No. 61/862,593 filed Aug. 6, 2013. The disclosures of all of the above referenced applications are hereby incorporated by reference in their entireties.

BACKGROUND

The present disclosure is directed to wireless communications and, more particularly, to network access methods and related mobile stations and base station subsystems.

In a typical cellular radio system, mobile stations (also referred to as user equipment unit nodes, UEs, and/or wireless terminals) communicate via a radio access network (RAN) with one or more core networks. The RAN covers a geographical area which is divided into cell areas, with each cell area being served by a base station subsystem (also referred to as a radio base station, base station, RAN node, a "NodeB", and/or enhanced NodeB "eNodeB"). A cell area is a geographical area where radio coverage is provided by the base station subsystem equipment at a base station subsystem site. The base station subsystems communicate through wireless radio communication channels with mobile stations within range of the base station subsystems.

A mobile station communicating with a base station subsystem transmits an access request over a random access channel when the mobile station has data for transmission to the base station subsystem, and responsive to the access request, the base station subsystem transmits an assignment message identifying uplink resources that have been allocated for the mobile station uplink data transmission(s). The base station subsystem, however, may not respond to a first access request transmitted by the mobile station, for example, in the following situations: (1) if there is a collision (i.e., interference) with another access request transmitted by another mobile station at the same time so that the first access request is not received by the base station subsystem; (2) if the mobile station is a relatively low priority mobile station so that the first access request is ignored in favor of requests from higher priority mobile stations; and (3) if the base station subsystem has insufficient resources to respond to all access requests (e.g., during a period of high traffic). Accordingly, a mobile station may need to transmit a number of access requests separated in time by respective retransmission intervals before receiving an assignment message identifying uplink resources for the uplink data transmission(s).

In situations where the mobile station transmits multiple access requests separated by retransmission intervals, the mobile station is required to look (e.g., monitor or search) for an assignment message from the base station subsystem during the retransmission interval between transmitting any two consecutive access requests and during the monitoring period between transmitting an access request and receiving a corresponding (matching) response. These extended monitoring periods may result in consumption of processing resources at the mobile station, consumption of power at the mobile station, and/or reduction of mobile station battery life.

SUMMARY

It may therefore be an object to address at least some of the above mentioned disadvantages and/or to improve performance in a wireless communication system. Some embodiments of present inventive concepts, for example, may reduce power consumption at the mobile station, reduce consumption of processing resources at the mobile station, and/or increase battery life at the mobile station.

According to some embodiments disclosed herein, a method of operating a mobile station requesting uplink access from a base station subsystem may include transmitting an access request to the base station subsystem, and delaying looking for a response matching the access request according to a delay interval that starts immediately after completing the transmission of the access request. A response time window (RTW) may be initiated after the delay interval, and during the response time window, the mobile station may look for an assignment message transmitted from the base station subsystem and matching the access request without looking for an assignment message matching the access request during the delay interval.

By delaying a start of the response time window, the duration of time over which the mobile station is required to look for a matching assignment message may be reduced. Accordingly, power consumption and/or processing overhead at the mobile station may be reduced, and/or battery life may be extended.

The access request may be a first access request of an access attempt, the delay interval may be a first delay interval, and the response time window may be a first response time window. A second access request of the access attempt may be transmitted to the base station subsystem after expiration of a retransmission time interval (TI) after transmitting the first access request. Looking for a response matching the second access request may be delayed according to a second delay interval, and a second response time window (RTW) may be initiated after the second delay interval. During the second response time window, the mobile station may look for an assignment message transmitted from the base station subsystem and matching the second access request without looking for an assignment message matching the second access request during the second delay interval.

The retransmission time interval may be a first retransmission time interval, and a third access request of the access attempt may be transmitted to the base station subsystem after expiration of a second retransmission time interval (TI) after transmitting the second access request. Looking for a response matching the third access request may be delayed according to a third delay interval, and a third response time window (RTW) may be initiated after the third delay interval. During the third response time window, the mobile station may look for an assignment message transmitted from the base station subsystem and matching the third access request without looking for an assignment message matching the third access request during the third delay interval. Moreover, the first, second, and third delay intervals may have a same duration, and the first and second retransmission time intervals may have different durations.

After initiating the first response time window, the first response time window may be terminated, and looking for an assignment message matching the first access request may include looking for an assignment message matching the first access request during the first response time window without looking for an assignment message matching the first access request after terminating the first response time window. In addition, transmitting the second access request may include transmitting the second access request after terminating the first response time window.

Looking for an assignment message matching the second access request may include looking for an assignment message matching the second access request during the second response time window without looking for an assignment message matching the first access request during the second response time window.

The first access request may include a first bit sequence, the second access request may include a second bit sequence different than the first bit sequence, and looking for an assignment message during the second response time window may include looking for an assignment message matching the second bit sequence without looking for an assignment message matching the first bit sequence.

Transmitting the second access request may include transmitting the second access request responsive to failure to receive an assignment message matching the first access request during the first response time window.

Transmitting the third access request may include transmitting the third access request responsive to failure to receive an assignment message matching the second access request during the second response time window.

The access request may be a first access request, and the response time window may be a response time window of the first access request. Before transmitting the first access request, a first response time window reduction status may be received from the base station subsystem, the first response time window reduction status may indicate that response time window reduction is enabled, and the delay interval may be provided responsive to the first response time window reduction status. After transmitting the first access request and initiating the response time window of the first access request, a second response time window reduction status may be received from the base station subsystem, and the second response time window reduction status may indicate that response time window reduction is disabled. After receiving the second response time window reduction status, a second access request may be transmitted to the base station subsystem. Responsive to transmitting the second access request and responsive to the second response time window reduction status indicating that response time window reduction is disabled, the mobile station may look for an assignment message transmitted from the base station subsystem and matching the second access request without delay after transmitting the second access request.

In addition, a response time window parameter may be received from the base station subsystem, and a duration of the delay interval between transmitting the access request and initiating the response time window may be based on the response time window parameter received from the base station subsystem.

Transmitting the access request may include transmitting the access request on a random access channel. Moreover, the access request may include a packet channel request message.

An assignment message may be received from the base station subsystem matching the access request during the response time window, and a packet switched communication may be transmitted to the base station subsystem responsive to receiving the assignment message matching the access request.

According to some other embodiments, a method of operating a base station subsystem communicating with a mobile station may include determining a response time window within which an assignment message will be transmitted responsive to an access request, and transmitting a response time window parameter including an indication of a delay interval provided between an access request and a beginning of the response time window within which an assignment message will be transmitted responsive to an access request.

Transmitting the response time window parameter may include transmitting the response time window parameter as system information. For example, transmitting the response time window parameter may include transmitting the response time window parameter as system information on a broadcast control channel.

An access request may be received from a mobile station on a random access channel.

A response time window reduction status may be transmitted, and the response time window reduction status may indicate that response time window reduction is enabled. After transmitting the response time window reduction status, an access request may be received, and an assignment message matching the access request may be transmitted during a response time interval defined by the response time window.

Transmitting the assignment message may include transmitting the assignment message matching the access request after the delay interval.

The response time window reduction status may be a first response time window reduction status, the access request may be a first access request, the assignment message may be a first assignment message matching the first access request, and the first assignment message may be transmitted with response time window reduction. After receiving the first access request, a second response time window reduction status may be transmitted, and the second response time window reduction status may indicate response time window reduction is disabled. After transmitting the second response time window reduction status, a second access request may be received, and responsive to receiving the second access request, a second assignment message matching the second access request may be transmitted without response time window reduction.

The response time window reduction status may be a first response time window reduction status, the response time window may be a first response time window, the response time window parameter may be a first response time window parameter, and the indication of a delay interval may be an indication of a first delay interval. A second response time window within which an assignment message will be transmitted may be determined. Responsive to the second response time window being greater than the first response time window, a second response time window reduction status may be transmitted, and the second response time window reduction status may indicate that response time window reduction is disabled. A second response time window parameter may be transmitted including an indication of a second delay interval provided between receiving an access request and a beginning of the second response time window within which an assignment message will be transmitted. Enabling response time window reduction status may be delayed. While keeping the response time widow reduction status disabled, assignment messages may be transmitted without RTW reduction responsive to subsequent access requests. After delaying enabling response time window reduction status, a third response time window reduction status may be transmitted, and the third response time window reduction status may indicate that response time window reduction is enabled.

After transmitting the third response time window reduction status, subsequent access requests may be received, and responsive to receiving the subsequent access requests after transmitting the third response time window reduction status, subsequent assignment messages may be transmitted matching the respective subsequent access requests using response time intervals defined by the second response time window parameter.

According to some other embodiments, a mobile station may include a transceiver configured to provide wireless communication with a base station subsystem of a radio access network, and a processor coupled to the transceiver. The processor may be configured to transmit an access request through the transceiver to the base station subsystem, to delay looking for a response matching the access request according to a delay interval, to initiate a response time window (RTW) after the delay interval, and during the response time window, to look for an assignment message transmitted from the base station subsystem and matching the access request without looking for an assignment message matching the access request during the delay interval.

According to still other embodiments, a base station subsystem in a radio access network may include a transceiver configured to provide wireless communication with a mobile station, and a processor coupled to the transceiver. The processor may be configured to determine a response time window within which an assignment message will be transmitted responsive to an access request received from the mobile station, and to transmit a response time window parameter through the transceiver wherein the response time window parameter includes an indication of a delay interval provided between an access request received from the mobile station and a beginning of the response time window within which an assignment message will be transmitted to the mobile station responsive to the access request.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 10A and 10B are flow charts illustrating base station operations according to some embodiments;

FIGS. 11, 12A, and 12B are flow charts illustrating mobile station operations according to some embodiments; and FIGS. 13A and 13B are tables illustrating mobile station power savings according to some embodiments.

DETAILED DESCRIPTION

Figures 1, 2:
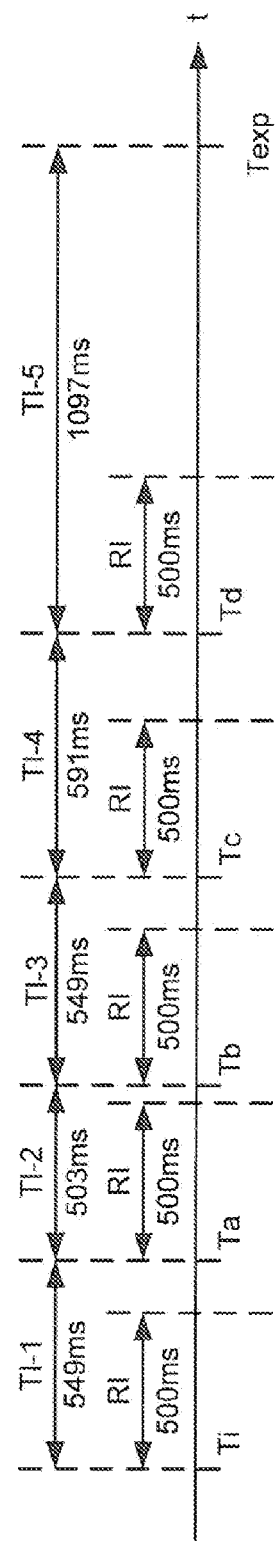
FIG. 1 is a table illustrating values of a parameter S corresponding to possible values of a parameter T (Tx-Integer) according to some embodiments.
FIG. 2 is a timing diagram illustrating retransmission intervals (also referred to as time intervals and/or transmission intervals) and response intervals (also referred to as response time windows) according to some embodiments.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a RAN that communicates over radio communication channels with mobile stations (also referred to as wireless terminals or UEs). It will be understood, however, that present inventive concepts are not limited to such embodiments and may be embodied generally in any type of communication network. As used herein, a mobile station (also referred to as a wireless terminal or UE) can include any device that receives data from a communication network, and may include, but is not limited to, a mobile telephone ("cellular" telephone), laptop/portable computer, pocket computer, hand-held computer, desktop computer, and/or a machine-type communications (MTC) device.

In some embodiments of a RAN, several base station subsystems can be connected (e.g., by landlines or radio channels) to a radio network controller (RNC). The radio network controller, also sometimes termed a base station controller (BSC), supervises and coordinates various activities of the plural base station subsystems connected thereto. The radio network controller is typically connected to one or more core networks.

General Packet Radio Service (GPRS) Enhanced Data Rates for the Global System for Mobile Communications (EDGE) Radio Access Networks (also referred to as GER-ANs) evolved from the Global System for Mobile Communications (GSM). Note that although terminology from 3GPP (3$^{rd}$ Generation Partnership Project) GERAN is used in this disclosure to exemplify embodiments of inventive concepts, this should not be seen as limiting the scope of inventive concepts to only these systems. Other wireless systems, including LTE (Long Term Evolution), WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station subsystem (e.g., BSS, base station, NodeB, eNodeB, or Evolved Node B) and mobile station (e.g., MS, wireless terminal, UE, or User Equipment) should be considering non-limiting and does not imply a certain hierarchical relation between the two. In general, a base station subsystem (e.g., a BSS) and a mobile station (e.g., an MS) are considered as examples of respective different communications devices that communicate with each other over a wireless radio channel. While embodiments discussed herein focus on wireless transmissions in an uplink from a mobile station MS to a base station subsystem BSS, embodiments of inventive concepts can also be applied, for example, in the downlink.

Figure 3:
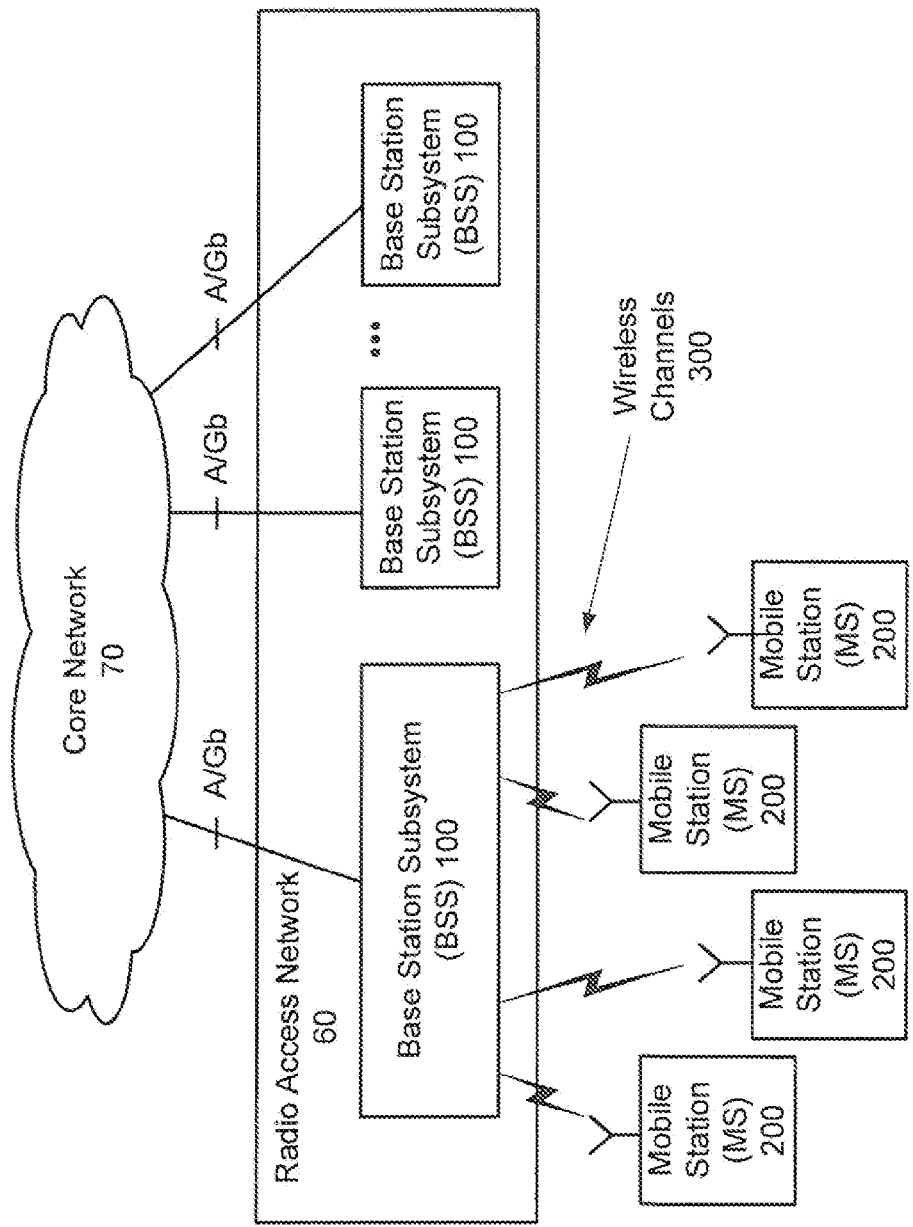
FIG. 3 is a block diagram of a communication system that is configured according to some embodiments.

FIG. 3 is a block diagram of a communication system that is configured to operate according to some embodiments of present inventive concepts. An example RAN 60 is shown that can be a GERAN. Radio base station subsystems BSSs 100 can be connected directly to one or more core networks 70. Radio base station subsystems 100 communicate over wireless channels 300 with mobile stations MSs (also referred to as wireless terminals, user equipment nodes, or UEs) 200 that are within their respective communication service cells (also referred to as coverage areas). The radio base station subsystems (BSSs) 100 can communicate with one another and/or with the core network(s) 70 through A/Gb interfaces, as is well known to one who is skilled in the art.

Figure 4:
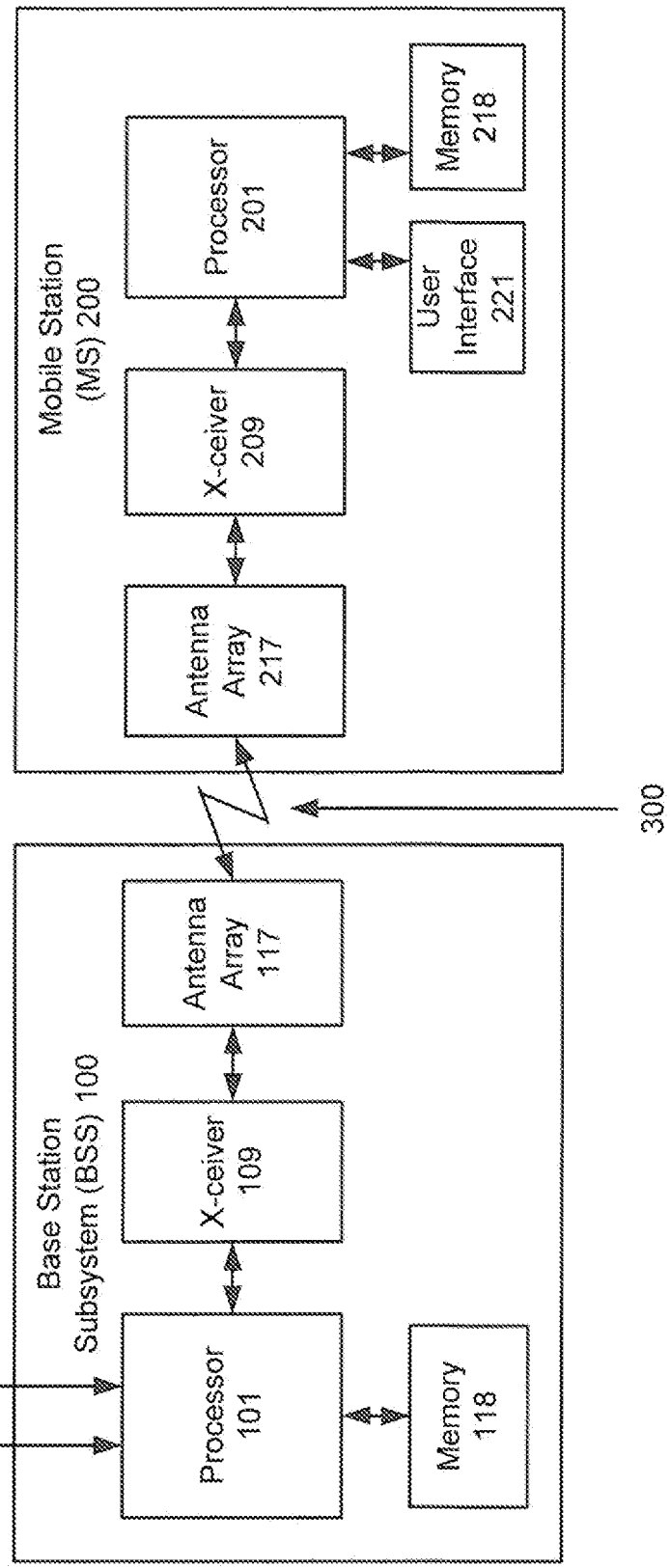
FIG. 4 is a block diagram illustrating a base station subsystem BSS and a mobile station MS according to some embodiments of FIG. 3.

FIG. 4 is a block diagram of a base station subsystem BSS 100 and a mobile station MS 200 of FIG. 3 in communication over wireless channel 300 according to some embodiments of present inventive concepts. As shown, base station subsystem 100 can include transceiver 109 coupled between processor 101 and antenna 117 (e.g., including an array of multiple antennas), and memory 118 coupled to processor 101. Moreover, mobile station MS 200 can include transceiver 209 coupled between antenna 217 and processor 201, and user interface 221 coupled to processor 201, and memory 218 coupled to processor 201. Accordingly, base station processor 101 transmits communications through transceiver 109 and antenna 117 for reception at mobile station processor 201 through antenna 217 and transceiver 209. In the other direction, mobile station processor 201 transmits communications through transceiver 209 and antenna 217 for reception at base station processor 101 through antenna 117 and transceiver 109. To support MIMO (allowing parallel transmission of multiple layers/streams of data using a same TFRE), each of antennas 117 and 217 can include an array of antenna elements. Mobile station 200 of FIG. 4, for example, may be a cellular radiotelephone, a smart phone, a laptop/netbook/tablet/handheld computer, a machine-type communications (MTC) device, or any other device providing wireless communications. User interface 211, for example, may include a visual display such as a liquid crystal display, a touch sensitive visual display, a keypad, a speaker, a microphone, etc. While user interface 221 is shown by way of example, mobile station MS 200 may not include a user interface, for example, if mobile station MS 200 is an MTC device, such as a remote sensor.

Considering mechanisms used when a mobile station MS attempts to detect a matching assignment message on the AGCH (Access Grant Channel) in response to a channel access request (also referred to as a channel request) sent on the RACH (Random Access Channel), power savings can be realized by modifying the way in which the mobile station MS monitors the AGCH while looking (e.g., monitoring, searching, etc.) for a matching assignment message. Improved battery life may be desirable, for example, in the following cases:

For remote devices that have no external power supply where increasing/maximizing connectivity time through extended battery life can be critical/important/desirable.

For networks that prefer to down prioritize access requests received from Machine-Type-Communication MTC devices (configured for Low Access Priority) during periods of CCCH congestion.

For devices that frequently experience less than nominal coverage or congestion such that a given access attempt often results in the transmission of multiple access requests.

For devices that have access to an external power supply where reducing/minimizing the frequency of battery recharge improves overall end-user experience.

An analysis of procedures for access request and response matching that takes into account values for S and T along with different worst case BSS response times is performed to reduce power consumption and/or increase mobile station battery life. T is the value of the parameter "Tx-integer" broadcast on the Broadcast Control Channel BCCH (see the first column in the table of FIG. 1) and M is the value of the parameter "max retrans" (maximum number of retransmissions) broadcast on the BCCH (i.e., where M=1, 2, 4 or 7). S is a parameter depending on the CCCH configuration and on the value of Tx-integer as defined in the third column of the table of FIG. 1.

Optimized/improved system access procedure (OSAP) is a mechanism that can enhance/improve AGCH (Access Grant Channel) capacity. According to the OSAP system access procedure, the amount of MS (Mobile Station) specific information within an assignment message sent on the AGCH can be reduced/minimized by using new BCCH (Broadcast Control Channel) information and PACCH (Packet Associated Control Channel) signaling to provide supplemental information needed for uplink TBF (Temporary Block Flow) establishment. In addition, further consideration is given to the part of the OSAP system access procedure wherein an MS attempts to match an Enhanced Immediate Assignment (EIA) message sent by the BSS (Base Station Subsystem, also referred to as a Base station) on the AGCH to an Enhanced Packet Channel Request (EPCR) message sent on the RACH.

An MS attempting an OSAP based system access first schedules the transmission of EPCR channel request messages and then sends up to M+1 EPCR packet channel request messages on the RACH (Random Access Channel) in a way such that:

When requesting resources for a PS (Packet Switched) connection other than in the case of sending a paging response, the mobile station sends the first EPCR packet channel request message in the first available TDMA frame belonging to the mobile station's RACH.

In all other cases, the number of slots belonging to the mobile station's RACH between initiation of the OSAP system access procedure and the first EPCR packet channel request message (excluding the slot containing the message itself) is a random value drawn randomly for each new initial assignment initiation with uniform probability distribution in the set {0, 1, . . . , max (T, 8)−1}.

The number of slots belonging to the mobile station's RACH between two successive EPCR packet channel request messages (excluding the slots containing the messages themselves) is a random value drawn randomly for each new transmission with uniform probability distribution in the set {S, S+1, . . . , S+T−1}.

T is the value of the parameter "Tx-integer" broadcast on the BCCH (see the table of FIG. 1) and M is the value of the parameter "max retrans" (or maximum number of retransmissions) broadcast on the BCCH (i.e., where M=1, 2, 4 or 7). S is a parameter depending on the CCCH (Common Control Channel) configuration and on the value of Tx-integer as defined in the table of FIG. 1.

After sending the first EPCR enhanced packet channel request message, the mobile station MS starts listening to the full downlink CCCH timeslot corresponding to its CCCH group in an attempt to find a matching EIA (Enhanced Immediate Assignment) message corresponding to one of its last 3 transmitted EPCR enhanced packet channel request messages.

Having sent M+1 EPCR packet channel request messages (i.e., the maximum allowed), the RR (Round-Robin scheduler) entity of the mobile station starts timer T3126.

The minimum value of T3126 can be equal to the time taken by T+2S slots of the mobile station's RACH (see the table of FIG. 1 for the values of S and T) with the maximum allowed value of this timer being limited to 5 seconds.

At expiry of timer T3126, the OSAP system access procedure is be aborted. If the OSAP system access procedure was triggered by a request from the MM (mobility management) sublayer, a random access failure is indicated to the MM sublayer.

Upon finding a matching EIA message at any time (i.e., regardless of whether the maximum number of EPCR packet channel request messages have been sent and prior to the expiration of T3126 if running), the mobile station MS acts on the matching EIA message and proceeds with its OSAP based system access in which case it stops looking for additional EIA messages on the AGCH.

CCCH (Common Control Channel) configuration attributes and parameters considered in some embodiments disclosed herein include:

S=109, TX-integer (T)=20 (as per Table 5 of 3GGP TR 43.868, V12.0.0, 2012-11, entitled "GERAN Improvements For Machine-Type Communications," the disclosure of which is hereby incorporated herein in its entirety by reference), Max retrans (M)=4, (S)=109, and each transmitted access request is an EPCR packet channel request message that includes 8 random bits.

One uplink slot per TDMA (Time Division Multiple Access) frame has been assigned as the RACH (i.e., the CCCH uplink consists only of RACH bursts that occur once every TDMA frame=4.615 ms).

8 bits of FN (Frame Number) Information is provided for each mobile station MS addressed by an EIA (Enhanced Immediate Assignment) message sent on the AGCH. This means that any instance of FN Information provided by an EIA message will reflect TDMA frames occurring at 1.18 sec intervals (i.e., the 8 least significant bits of the TDMA frame number repeat every 256*4.615 ms=1.18 sec).

Even though a mobile station MS only treats an assignment message with matching FN information as valid if it addresses one of its last 3 access attempts, the mobile station may not know how delayed any given EIA message is (i.e., the mobile station may not know the worst case BSS response time for an EPCR packet channel request message on the RACH). For this example, a worst case BSS response time of 500 ms has been assumed.

According to OSAP system access procedures, the MS only considers an EIA message as a potentially matching assignment message if it corresponds to one of its last 3 transmitted EPCR packet channel request messages. In other words, when attempting to determine if it has received a potentially matching assignment message, a mobile station MS only compares the FN Information received in any given EIA message to the 8 least significant bits of the TDMA frame number associated with its last 3 transmitted EPCR packet channel request messages.

Timer T3126 (started after sending the maximum allowed number of EPCR packet channel request messages) can have a duration equal to (T+2S) TDMA frames (where 1 TDMA frame=4.61 ms) up to a maximum of 5 seconds.

The initial access request (EPCR packet channel request message) of a given system access attempt is sent on the RACH at time t=Ti and is followed by 4 additional access requests (EPCR packet channel requests) sent using RACH slots that are randomly spaced in the range {S, S+1, . . . , S+T−1}={109, 110 . . . 128} TDMA frames apart.

The minimum spacing between two successive access requests is therefore 109 TMDA frames (503 ms), the maximum spacing is 128 TDMA frames (591 ms), and an average spacing is 119 TDMA frames (549 ms).

For this example, the 2nd access request is sent at time t=Ta (Ti+549 ms), the 3rd access request is sent at time t=Tb (Ta+503 ms), the 4th access request is sent at time t=Tc (Tb+549 ms), and the $5^{th}$ (and final) access request is sent at time t=Td (Tc+591 ms) as shown in FIG. 2.

After transmitting the last access request at t=Td the mobile station MS continues to look (e.g., monitor, search, etc.) for matching assignment messages corresponding to one of its last 3 access requests for 120 TDMA frames (T+2S=238 TDMA frames=1098 ms) according to the definition of timer T3126.

Note that regardless of the retransmission interval in which mobile station MS1 looks (e.g., monitors, searches, etc.) for a matching immediate assignment (IA) message, the probability of collision between two mobile stations attempting system access using the same request reference information at the same time (i.e., using the same RACH burst) may be considered to be negligible. Stated in other words, the probability is very low that two mobile stations both send a channel request with the same FN information (i.e., using the same RACH burst such that the value for FN modulo X is the same) and the same random access information (i.e., they select the same random bits for inclusion within the identifying bit sequence comprising the EPCR message), where X is set to reflect an acceptable probability for TDMA (Time Division Multiple Access) frame number collision. For example, for X=256, the time between uplink bursts for which FN mod 256 has the same value is 1.18 seconds (i.e., each TDMA frame=4.615 ms, 256*4.516 ms=1.18 seconds).

According to legacy operations, a mobile station MS only treats a matching immediate assignment (IA) message as valid if it matches one of its last three access attempts because the mobile station MS does not know how delayed any given IA message is because the mobile station MS does not know a worst case BSS response time for channel request messages on the RACH random access channel. Assuming a worst case BSS response time of 500 ms and considering the 5 retransmission intervals shown in FIG. 2, the retransmission intervals of FIG. 2 apply as discussed below.

Retransmission interval 1 TI-1 (also referred to as time interval 1) is the retransmission interval starting at time t=Ti when mobile station MS1 sends its initial access request and ending just before it sends its 2nd access request at time t=Ta (i.e., a 549 ms interval).

Since a worst case BSS response time of 500 ms has been assumed, an assignment message received in Retransmission interval 1 (TI-1) only reflects an access request sent at time t=Ti (i.e., it cannot also potentially reflect an access request sent at t=Ti−1.18 which would have the same 8 LSBs or Least Significant Bits of the TDMA frame sent at t=Ti). Accordingly, mobile station MS1 only needs to consider the first 500 ms of Retransmission interval 1 (TI-1) when looking (e.g., monitoring, searching, etc.) for an IA message that matches the initial access request sent at time t=Ti.

As such, a collision may occur only as a result of mobile station MS1 and another mobile station MS sending the same access request at time t=Ti. Based on using 8 Random bits within an EPCR packet channel request message sent at t=Ti, the probability of collision (PoC) occurring for a matching assignment message received in Retransmission interval 1 (TI-1) is therefore be PoCi=1/256.

Retransmission interval 2 TI-2 (also referred to as time interval 2) is the retransmission interval starting at time t=Ta when MS1 sends its $2^{nd}$ access request and ending just before it sends its $3^{rd}$ access request at time t=Tb (i.e., a 503 ms interval):

Since a worst case BSS response time of 500 ms has been assumed, an assignment message received in Retransmission interval 2 (TI-2) only reflects an access request sent at time t=Ta. Accordingly, mobile station MS1 only needs to consider Retransmission interval 2 (TI-2) when looking (e.g., monitoring, searching, etc.) for an IA message that matches the second access request sent at time t=Ta (i.e., mobile station MS1 does not need to look/monitor/search for an IA message matching the first access request sent at time t=Ti).

As such, a collision can occur as a result of mobile station MS1 and another mobile station MS sending the same access request at time t=Ta. Based on using 8 Random bits within an EPCR packet channel request message sent at t=Ta, the probability of collision (PoC) occurring for a matching assignment message received in Retransmission interval 2 (TI-2) is therefore PoCa=1/256.

Note that in the Retransmission interval 2 (TI-2), the MS still looks (e.g., monitors, searches, etc.) for an assignment message sent in response to its initial access request (i.e., even though the corresponding 500 ms BSS response time has expired) since, according to the specifications, it will be looking (e.g., monitoring, searching, etc.) for a response to any of its last 3 transmitted access request messages.

Retransmission interval 3 TI-3 (also referred to as time interval 3) is the retransmission interval starting at time t=Tb when mobile station MS1 sends its $3^{rd}$ access request and ending just before it sends its $4^{th}$ access request at time t=Tc (i.e., a 549 ms interval):

Since a worst case BSS response time of 500 ms has been assumed, an assignment message received in Retransmission interval 3 (TI-3) only reflects an access request sent at time t=Tb. Accordingly, mobile station MS1 only needs to consider the first 500 ms of Retransmission interval 3 (TI-3) when looking (e.g., monitoring, searching, etc.) for an IA message that matches the access request sent at time t=Tb (i.e., mobile station MS1 does not need to look for an IA message matching the access request sent at time t=Ti or the access request sent at time t=Ta).

As such, a collision can occur as a result of mobile station MS1 and another mobile station MS sending the same access request at time t=Tb. Based on using 8 Random bits within an EPCR packet channel request message sent at t=Tb, the probability of collision (PoC) occurring for a matching assignment message received in Retransmission interval 3 (TI-3) is therefore PoCb=1/256.

Note that in the Retransmission interval 3 (TI-3) the MS still looks (e.g., monitors, searches, etc.) for an assignment message sent in response to its initial access request or second access request (i.e., even though the corresponding 500 ms BSS response times have expired) since, according to the specifications, it will be looking (e.g., monitoring, searching, etc.) for a response to any of its last 3 transmitted access request messages.

Retransmission interval 4 TI-4 (also referred to as time interval 4) is the retransmission interval starting at time t=Tc when mobile station MS1 has sent its $4^{th}$ access request and ending just before it sends its $5^{th}$ access request at time t=Td (i.e., a 591 ms interval):

Since a worst case BSS response time of 500 ms has been assumed, an assignment message received in Retransmission interval 4 (TI-4) can only reflect an access request sent at time t=Tc. Accordingly, mobile station MS1 only needs to consider the first 500 ms of Retransmission interval TI-4 when looking (e.g., monitoring, searching, etc.) for an IA message that matches the access request sent at time t=Tc (i.e., mobile station MS1 does not need to look (e.g., monitor, search, etc.) for an IA message matching the access request sent at time t=Ti, the access request sent at time t=Ta, or the access request sent at time t=Tb).

As such, a collision can occur as a result of mobile station MS1 and another mobile station MS sending the same access request at time t=Tc. Based on using 8 Random bits within an EPCR packet channel request message sent at t=Tc, the probability of collision (PoC) occurring for a matching assignment message received in Retransmission interval 4 (TI-4) is therefore PoCc=1/256.

Note that in the Retransmission interval 4 (TI-4) the mobile station MS still looks (e.g., monitors, searches, etc.) for an assignment message sent in response to its second or third access request (i.e., even though the corresponding 500 ms BSS response times have expired) since, according to the specifications, it will be looking (e.g., monitoring, searching, etc.) for a response to any of its last 3 transmitted access request messages.

Retransmission interval 5 TI-5 (also referred to as time interval 5) is the retransmission interval starting when mobile station MS1 has sent its $5^{th}$ access request at time t=Td (at which point time T3126 starts) and ending when timer T3126 expires at time t=Texp (i.e., a 1098 ms interval):

Since a worst case BSS response time of 500 ms has been assumed, an assignment message received in Retransmission interval 5 (TI-5) can only reflect an access request sent at time t=Td. Accordingly, mobile station MS1 only needs to consider the first 500 ms of Retransmission interval 5 (TI-5) when looking (e.g., monitoring, searching, etc.) for an IA messages that matches the access request sent at time t=Td (i.e., mobile station MS1 does not need to look (e.g., monitor, search, etc.) for an IA message matching the access request sent at time t=Ti, the access request sent at time t=Ta, the access request sent at time t=Tb, or the access request sent at time t=Tc).

As such, a collision can occur as a result of mobile station MS1 and another mobile station MS sending the same access request at time t=Td. Based on using 8 Random bits within an EPCR packet channel request message sent at t=Td, the probability of collision (PoC) occurring for a matching assignment message received in Retransmission interval 5 (TI-5) is therefore PoCd=1/256.

Note that in the Retransmission interval 5 (TI-5), the mobile station MS still looks (e.g., monitor, search, etc.) for an assignment message sent in response to its third or fourth access request (i.e., even though the corresponding 500 ms BSS response times have expired) since, according to the specifications, it will be looking (e.g., monitoring, searching, etc.) for a response to any of its last 3 transmitted access request messages.

In light of the example discussed above with respect to FIG. 2, a mobile station that attempts system access using OSAP system access procedures can potentially reduce power consumption by only looking (e.g., monitoring, searching, etc.) for an assignment message that matches its most recently transmitted access request (without looking, monitoring, and/or searching for assignment messages matching a plurality of previously transmitted access requests) within a limited retransmission interval immediately following that most recently transmitted access request.

For example, if system information indicates a maximum BSS response time of 500 ms applies, the mobile station MS only looks (e.g., monitor, search, etc.) for a matching assignment message for 500 ms after sending any given access request.

With greater real time performance of a base station subsystem BSS, lower values for the maximum BSS response time may be indicated in system information so that the mobile station MS spends less time looking (e.g., monitoring, searching, etc.) for a matching assignment message after sending any given access request, resulting in the potential for reduced mobile station MS power consumption.

For the case where system information indicates a maximum BSS response time of 250 ms, for example, the amount of time a mobile station MS spends looking (e.g., monitoring, searching, etc.) for a matching assignment message is reduced to about half of that required for a 500 ms maximum BSS response time. As such, allowing system information to indicate the maximum BSS response time may be beneficial in that it leads to substantial mobile station MS power savings (e.g., for the case where the first access request is missed by the BSS but it receives the second access request).

A mobile station can reduce power consumption by only looking (e.g., monitoring, searching, etc.) for a matching IA message corresponding to its most recently transmitted access request within a time window determined by a worst case BSS response time (provided by the base station subsystem BSS).

This power savings feature can be used when system information (provided by the base station subsystem BSS) indicates such a worst case BSS response time. In the absence of a worst case BSS response time provided by the base station subsystem BSS, mobile station MS1 may look (e.g., monitor, search, etc.) for IA messages corresponding to a plurality (e.g., up to three) of the most recently transmitted access requests over the entirety of each of the retransmission intervals TI-1, TI-2, TI-3, TI-4, and TI-5.

Considering that maximum base station subsystem BSS response times can vary between different equipment vendors and that substantial mobile station MS power savings are possible based on this maximum response time, system information can be enhanced to allow indication of the maximum (worst case) BSS response time (i.e., independent of whether or not the BSS supports OSAP). More specifically, for the case where system information indicates the maximum (worst case) BSS response time and the S and T values applicable for a given system configuration result in the spacing of access request messages that exceed the maximum BSS response time, the following mobile station MS power savings enhancements can be supported:

A mobile station MS only looks (e.g., monitors, searches, etc.) for an assignment message that matches its last transmitted access request (i.e., instead of supporting legacy operation whereby an MS looks/monitors/searches for an assignment message matching any of its last 3 transmitted access requests).

A mobile station MS makes use of the indicated maximum (worst case) BSS response to determine how long to look (e.g., monitor, search, etc.) for a matching assignment message following the transmission of any given access request.

A mobile station MS that takes into account the worst case (maximum) base station subsystem BSS response time when looking (e.g., monitoring, searching, etc.) for a matching immediate assignment (IA) message on a per retransmission interval (TI) basis as described above can experience a processing savings (compared to the legacy matching procedure LMP).

A mobile station MS that enables a Matching Procedure according to embodiments disclosed herein may not experience significant impact on access success rate when reducing its matching time interval (i.e., its response interval RI) down to 100 ms for system loads consisting of a user arrival rate ranging from 10 to 20 users per second. Similarly, a mobile station MS that enables matching procedures according to embodiments disclosed herein may experience the same lack of impact on its Access Success Rate when reducing its lookback time down from that associated with legacy operations to 100 ms, while the Delay performance may be unaffected down to 200 ms (after which it may be only slightly impacted).

A reason that these performance metrics may remain substantially unaffected by a reduction in lookback time is due to a practical impact that radio conditions have on system access performance (e.g., RACH collisions can occur regardless of lookback time). The delay imposed by BSS queuing of access responses to be sent on the AGCH can vary somewhat according to BSS implementations, but this implementation specific variable may be quite dynamic, and in practice, can be seen as having a value less than 100 ms for a high percentage of loading conditions. In addition, the matching procedures according to some embodiments disclosed herein target power savings in the mobile station MS without addressing overload control since a legacy strategy for a mobile station MS resending a given access request up to Max. Retrans. (maximum number of retransmission M) is not significantly impacted. Stated in other words, matching procedures according to some embodiments disclosed herein only impact the duration of the time period that a mobile station MS looks (e.g., monitors, searches, etc.) for a matching response on the AGCH after sending/resending an access request on the RACH.

Some embodiments of inventive concepts will now be discussed in greater detail below with respect to FIGS. 5, 6, and 7.

As discussed above according to some embodiments, base station subsystem BSS determines system parameters (including S, T, M, and RT) that define mobile station MS operations to transmit/retransmit access requests and to look (e.g., monitor, search, etc.) for responsive assignment messages. More particularly, base station subsystem BSS determines a worst case or maximum response time that defines a period of time within which an assignment message will be transmitted responsive to an access request from mobile station MS. Accordingly, base station subsystem BSS transmits an indication of the worst case response time RT to mobile station MS, and mobile station MS uses the indication of the response time to determine a response interval RI over which mobile station MS should look (e.g., monitor, search, etc.) for a response to an access request, thereby reducing mobile station power consumption and/or processing overhead and/or increasing battery life.

Figure 5:
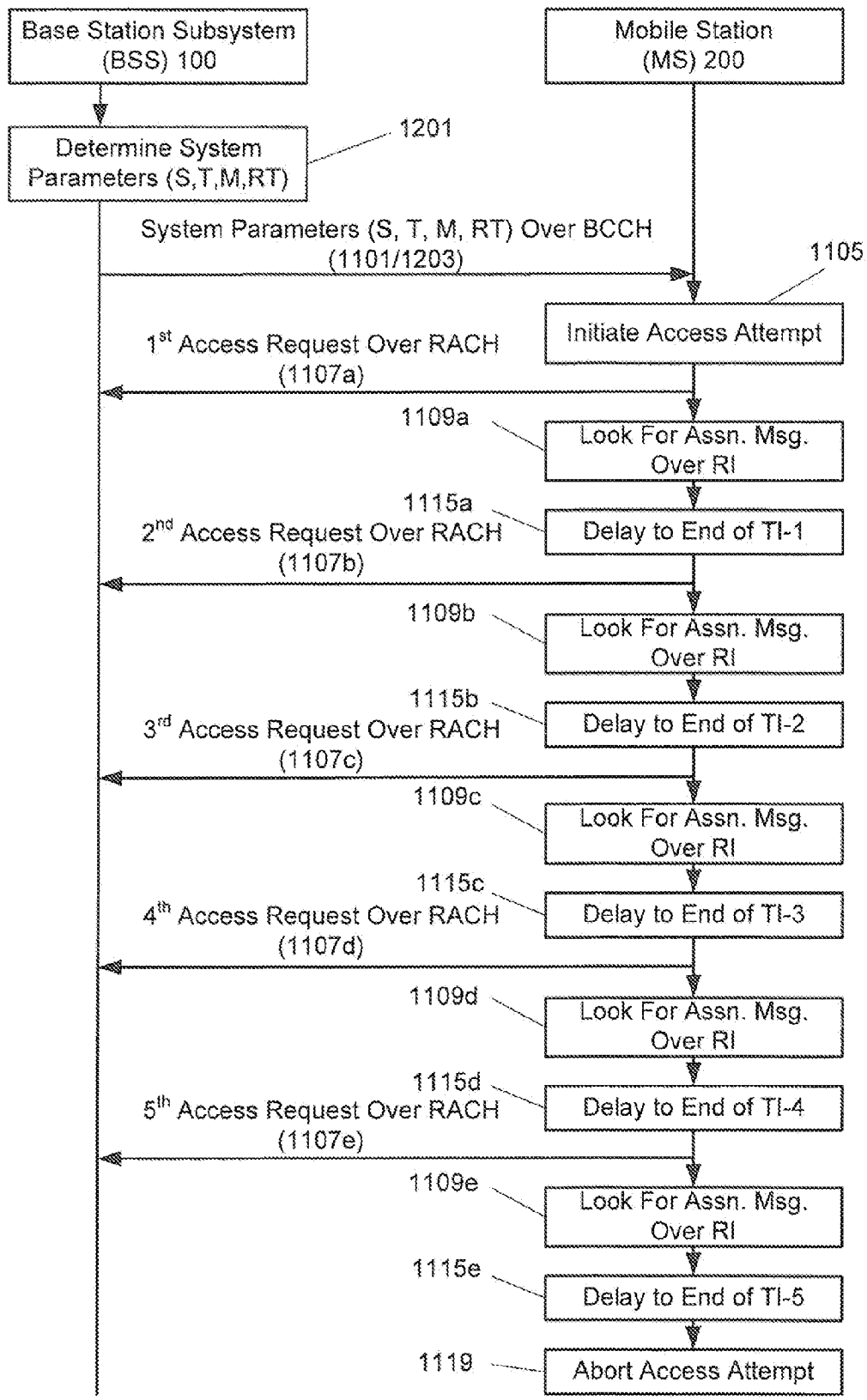
FIG. 5 is a signaling diagram illustrating signaling between a base station subsystem BSS and a mobile station MS according to some embodiments.
Figure 7:
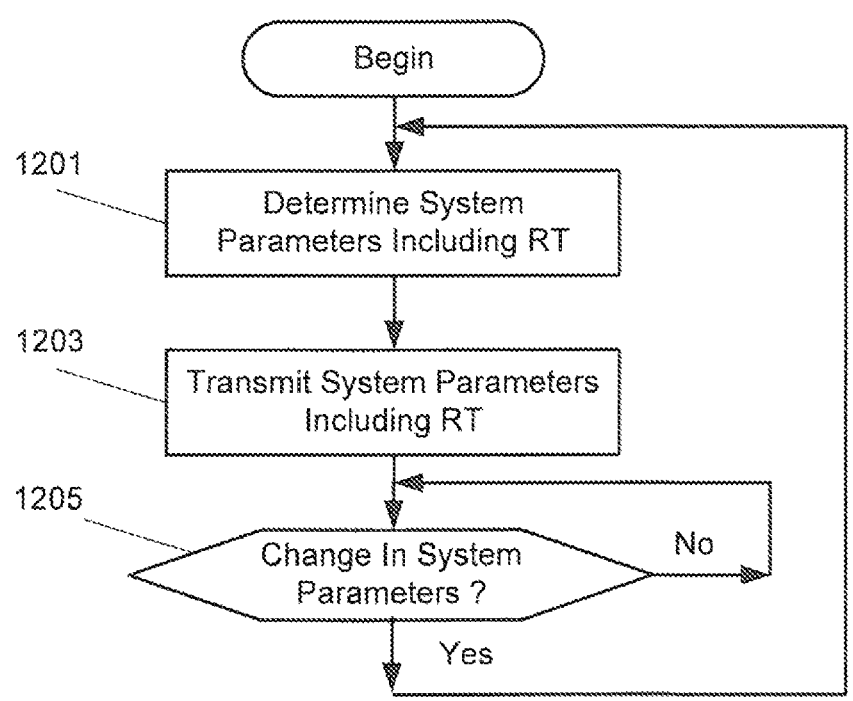
FIG. 7 is flow chart illustrating base station subsystem operations according to some embodiments.

As shown in FIGS. 5 and 7, base station subsystem processor 101 determines system parameters for mobile station MS access requests over a random access channel at block 1201. More particularly, base station subsystem processor 101 determines a response time (e.g., a worst case or maximum response time), wherein the response time defines a period within which an assignment message will be transmitted responsive to an access request received from the mobile station MS, and an indication of the response time RT is included as one of the system parameters. In addition, the system parameters can include S, T, and M as discussed above. At block 1203, base station subsystem processor 101 transmits (e.g., through transceiver 109 and antenna 117) the system parameters (including the indication of the response time RT) to the mobile station (MS), for example, over a broadcast control channel BCCH.

Moreover, base station subsystem processor 101 can dynamically determine the system parameters (e.g., including S, T, M, and RT) responsive to current communications traffic. Accordingly, the response time and corresponding indication RT can change responsive to changing traffic patterns, changing loads, different times of the day, etc. As shown at block 1205, when the system parameters change, base station subsystem processor 101 can repeat operations of determining and transmitting new system parameters at blocks 1201 and 1203.

Figure 6:
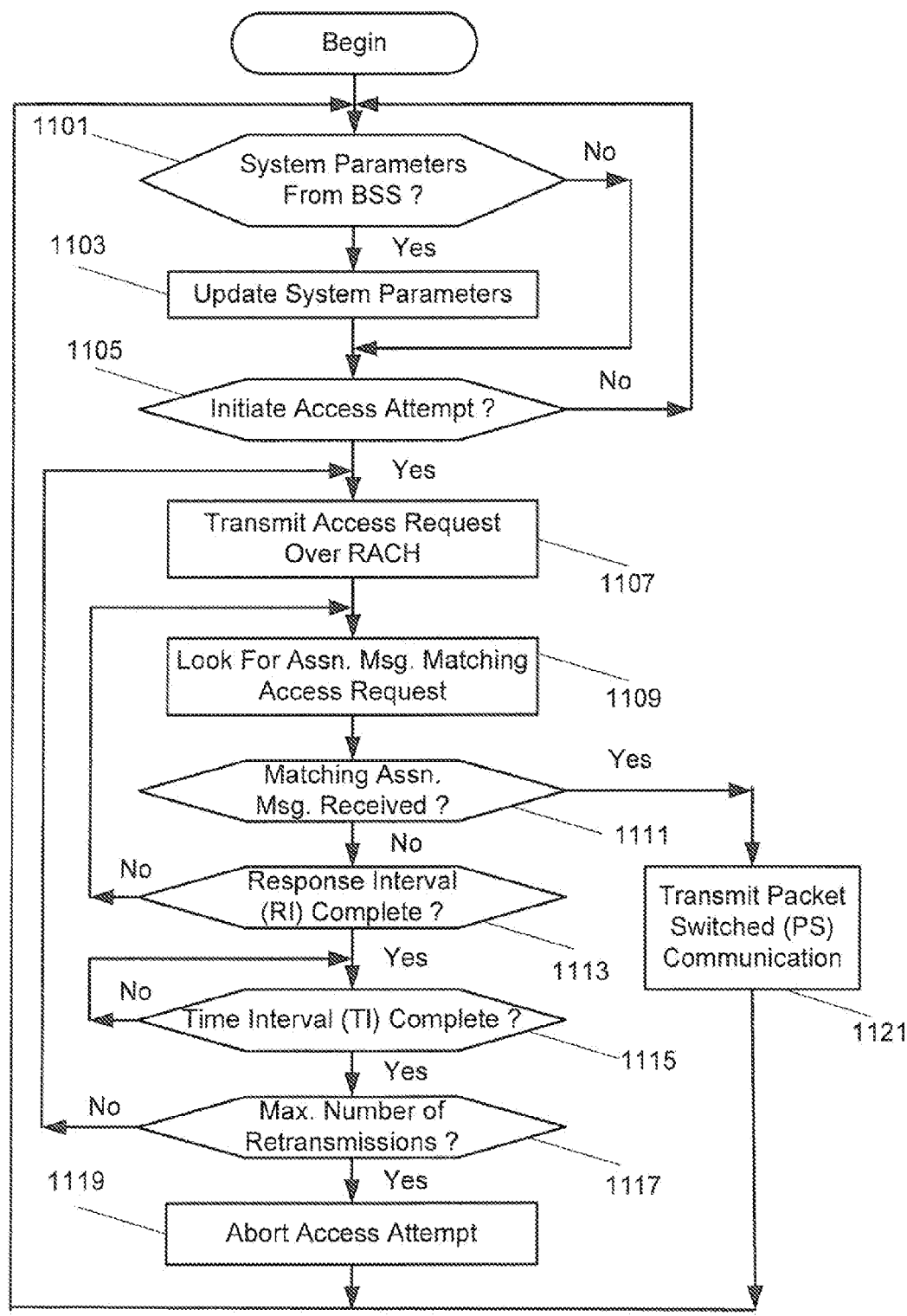
FIG. 6 is a flow chart illustrating mobile station operations according to some embodiments.

When system parameters (e.g., S, T, M, and RT) are transmitted by base station subsystem BSS 100 over the broadcast control channel as discussed above with respect to FIGS. 5 and 7, mobile station processor 201 receives (through antenna 217 and transceiver 209) the system parameters at block 1101 of FIG. 6 (also shown as message 1101/1203 of FIG. 5), with the system parameters including the indication of a response time RT. As discussed above, a duration of the response interval RI is based on the indication of the response time RT received from the base station subsystem BSS, and more particularly, the indication of the response time RT can be an indication of a worst case response time. Upon receipt of system parameters, mobile station processor 201 updates the system parameters at block 1103.

At block 1105 of FIGS. 5 and 6, mobile station processor 201 determines if an access attempt should be initiated. An access attempt can be initiated, for example, when mobile station processor 201 determines that data is available for a packet switched PS transmission over an uplink to base station subsystem BSS. If an access attempt is initiated at block 1105, mobile station processor 201 transmits one or a plurality of access requests as discussed below. In the example discussed below, up to five access requests are transmitted by mobile station MS (i.e., one initial access request and four retransmissions of the access request in accordance with the system parameter M equal to four 4) during an access attempt before aborting the access attempt if no matching assignment message is received.

Operations of mobile station MS and base station subsystem BSS according to some embodiments disclosed herein will now be discussed with reference to FIGS. 5, 6, and 7.

Responsive to initiating an access attempt at block 1105, mobile station processor 201 transmits a first/initial access request (through transceiver 209 and antenna 217) over the random access channel RACH to base station subsystem BSS at block 1107 of FIG. 6 (also indicated by message 1107a of FIG. 5). More particularly, mobile station processor 201 transmits the first access request at time Ti as shown in FIG. 2, with the first access request being a first packet channel request (e.g., an EPCR) message. After transmitting the first access request, mobile station processor 201 looks (e.g., monitors, searches, etc.) for an assignment message matching the first access request received from the base station subsystem BSS (through antenna 217 and transceiver 209) during the response interval RI at block 1109 (also shown as block 1109a of FIG. 5). Moreover, the first access request includes an identifying bit sequence that is unique relative to other access requests transmitted by mobile station processor 201 during the access attempt.

If an assignment message matching the first access request (e.g., having an identifying bit sequence matching the identifying bit sequence of the first access request) is received by the mobile station processor 201 (through antenna 217 and transceiver 209) during the first response interval RI at blocks 1109 (also shown as block 1109a of FIG. 5), 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching the first access request is not received by the mobile station processor 201 (through antenna 217 and transceiver 209) before expiration of the first response interval RI at blocks 1109 also shown as block 1109a of FIG. 5), 1111, and/or 1113, mobile station processor 201 continues to wait until expiration/completion of retransmission interval TI-1 at block 1115 of FIG. 6 (also shown at block 1115a of FIG. 5) before transmitting a next access request.

As discussed above with respect to FIG. 2, retransmission interval TI-1 can be defined by system parameters (e.g., S and T), and retransmission interval TI-1 is longer than response interval RI. Accordingly, mobile station power consumption and/or processing overhead may be reduced and/or mobile station battery life may be increased by terminating looking (e.g., monitoring, searching, etc.) for an assignment message matching the first access request after expiration of response interval RI. Accordingly, mobile station processor 201 will wait at block 1115 of FIG. 6 (also indicated by block 1115a of FIG. 5) without monitoring for an assignment message matching the first access request between expiration of the first response interval RI and transmitting a second access request after expiration of retransmission interval TI-1.

Responsive to failure receiving an assignment message matching the first access request during the first response interval RI at blocks 1109/1109a, 1111, and 1113, and responsive to expiration of retransmission interval TI-1 at block 1115/1115a, mobile station processor 201 transmits a second access request for the access attempt (through transceiver 209 and antenna 217) over the random access channel RACH to base station subsystem BSS at block 1107 of FIG. 6 (also indicated by message 1107b of FIG. 5). The second access request may also be referred to as a first retransmission of the access request for the access attempt. More particularly, mobile station processor 201 transmits the second access request at time Ta as shown in FIG. 2, with the second access request being a second packet channel request (e.g., an EPCR) message. After transmitting the second access request, mobile station processor 201 looks (e.g., monitors, searches, etc.) for an assignment message matching the second access request received from the base station subsystem BSS (through antenna 217 and transceiver 209) during the second response interval RI at block 1109 (also shown as block 1109b of FIG. 5). Moreover, the second access request includes an identifying bit sequence that is unique relative to other access requests transmitted by mobile station processor 201 during the access attempt. More particularly, the identifying bit sequences for the first and second access requests are different.

If an assignment message matching the second access request (e.g., having an identifying bit sequence matching the identifying bit sequence of the second access request) is received by the mobile station processor 201 (through antenna 217 and transceiver 209) during the second response interval RI at blocks 1109 (also shown as block 1109b of FIG. 5), 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching the second access request is not received by the mobile station processor 201 (through antenna 217 and transceiver 209) before expiration of the second response interval RI at blocks 1109 (also shown as block 1109b of FIG. 5), 1111, and/or 1113, mobile station processor 201 continues to wait until expiration/completion of retransmission interval TI-2 at block 1115 of FIG. 6 (also shown at block 1115b of FIG. 5) before transmitting a next access request.

As discussed above with respect to FIG. 2, retransmission interval TI-2 can be defined by system parameters (e.g., S and T), and retransmission interval TI-2 is longer than response interval RI. Accordingly, mobile station power consumption and/or processing overhead may be reduced and/or mobile station battery life may be increased by terminating looking (e.g., monitoring, searching, etc.) for an assignment message matching the second access request after expiration of response interval RI. Accordingly, mobile station processor 201 will wait at block 1115 of FIG. 6 (also indicated by block 1115b of FIG. 5) without monitoring for an assignment message matching the second access request (or the first access request) between expiration of the second response interval RI and transmitting a third access request after expiration of retransmission interval TI-2.

Because the first and second access request include different identifying bit sequences, mobile station processor 201 can look (e.g., monitor, search, etc.) for an assignment message matching only the second access request during the second response interval RI (e.g., at block 1109b of FIG. 5) without monitoring for an assignment message matching the first access request.

Responsive to failure receiving an assignment message matching the second access request during the second response interval RI at blocks 1109/1109b, 1111, and 1113, and responsive to expiration of retransmission interval TI-2 at block 1115/1115b, mobile station processor 201 transmits a third access request for the access attempt (through transceiver 209 and antenna 217) over the random access channel RACH to base station subsystem BSS at block 1107 of FIG. 6 (also indicated by message 1107c of FIG. 5). The third access request may also be referred to as a second retransmission of the access request for the access attempt. More particularly, mobile station processor 201 transmits the third access request at time Tb as shown in FIG. 2, with the third access request being a third packet channel request (e.g., an EPCR) message. After transmitting the third access request, mobile station processor 201 looks (e.g., monitors, searches, etc.) for an assignment message matching the third access request received from the base station subsystem BSS (through antenna 217 and transceiver 209) during the third response interval RI at block 1109 of FIG. 6 (also shown as block 1109c of FIG. 5). Moreover, the third access request includes an identifying bit sequence that is unique relative to other access requests transmitted by mobile station processor 201 during the access attempt. More particularly, the identifying bit sequence for the third access request is different than identifying bit sequences for either of the first and second access requests.

If an assignment message matching the third access request (e.g., having an identifying bit sequence matching the identifying bit sequence of the third access request) is received by the mobile station processor 201 (through antenna 217 and transceiver 209) during the third response interval RI at blocks 1109/1109c, 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching the third access request is not received by the mobile station processor 201 (through antenna 217 and transceiver 209) before expiration of the third response interval RI at blocks 1109/1109c, 1111, and/or 1113, mobile station processor 201 continues to wait until expiration/completion of retransmission interval TI-3 at block 1115 of FIG. 6 (also shown at block 1115c of FIG. 5) before transmitting a next access request.

As discussed above with respect to FIG. 2, retransmission interval TI-3 can be defined by system parameters (e.g., S and T), and retransmission interval TI-3 is longer than response interval RI. Accordingly, mobile station power consumption and/or processing overhead may be reduced and/or mobile station battery life may be increased by terminating looking (e.g., monitoring, searching, etc.) for an assignment message matching the third access request after expiration of response interval RI. Accordingly, mobile station processor 201 will wait at block 1115 of FIG. 6 (also indicated by block 1115c of FIG. 5) without monitoring for an assignment message matching the third access request (or any of the previous two access requests) between expiration of the third response interval RI and transmitting a fourth access request after expiration of retransmission interval TI-3.

Because the first, second, and third access requests include different identifying bit sequences, mobile station processor 201 can look (e.g., monitor, search, etc.) for an assignment message matching only the third access request during the third response interval RI (e.g., at block 1109c of FIG. 5) without monitoring for an assignment message matching either of the first and/or second access requests.

Responsive to failure receiving an assignment message matching the third access request during the third response interval RI at blocks 1109/1109c, 1111, and 1113, and responsive to expiration of retransmission interval TI-3 at block 1115/1115c, mobile station processor 201 transmits a fourth access request for the access attempt (through transceiver 209 and antenna 217) over the random access channel RACH to base station subsystem BSS at block 1107 of FIG. 6 (also indicated by message 1107d of FIG. 5). The fourth access request may also be referred to as a third retransmission of the access request for the access attempt. More particularly, mobile station processor 201 transmits the fourth access request at time Tc as shown in FIG. 2, with the fourth access request being a fourth packet channel request (e.g., an EPCR) message. After transmitting the fourth access request, mobile station processor 201 looks (e.g., monitors, searches, etc.) for an assignment message matching the fourth access request received from the base station subsystem BSS (through antenna 217 and transceiver 209) during the fourth response interval RI at block 1109 of FIG. 6 (also shown as block 1109d of FIG. 5). Moreover, the fourth access request includes an identifying bit sequence that is unique relative to other access requests transmitted by mobile station processor 201 during the access attempt. More particularly, the identifying bit sequence for the fourth access request is different than identifying bit sequences for any of the first, second, and third access requests.

If an assignment message matching the fourth access request (e.g., having an identifying bit sequence matching the identifying bit sequence of the fourth access request) is received by the mobile station processor 201 (through antenna 217 and transceiver 209) during the fourth response interval RI at blocks 1109/1109d, 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching the fourth access request is not received by the mobile station processor 201 (through antenna 217 and transceiver 209) before expiration of the fourth response interval RI at blocks 1109/1109d, 1111, and/or 1113, mobile station processor 201 continues to wait until expiration/completion of retransmission interval TI-4 at block 1115 of FIG. 6 (also shown at block 1115d of FIG. 5) before transmitting a next access request.

As discussed above with respect to FIG. 2, retransmission interval TI-4 can be defined by system parameters (e.g., S and T), and retransmission interval TI-4 is longer than response interval RI. Accordingly, mobile station power consumption and/or processing overhead may be reduced and/or mobile station battery life may be increased by terminating looking (e.g., monitoring, searching, etc.) for an assignment message matching the fourth access request after expiration of response interval RI. Accordingly, mobile station processor 201 will wait at block 1115 of FIG. 6 (also indicated by block 1115d of FIG. 5) without monitoring for an assignment message matching the fourth access request (or any of the previous three access requests) between expiration of the fourth response interval RI and transmitting a fifth access request after expiration of retransmission interval TI-4.

Because the first, second, third, and fourth access requests include different identifying bit sequences, mobile station processor 201 can look (e.g., monitor, search, etc.) for an assignment message matching only the fourth access request during the fourth response interval RI (e.g., at block 1109d of FIG. 5) without monitoring for an assignment message matching any of the first, second, or third access requests.

Responsive to failure receiving an assignment message matching the fourth access request during the fourth response interval RI at blocks 1109/1109d, 1111, and 1113, and responsive to expiration of retransmission interval TI-4 at block 1115/1115d, mobile station processor 201 transmits a fifth access request for the access attempt (through transceiver 209 and antenna 217) over the random access channel RACH to base station subsystem BSS at block 1107 of FIG. 6 (also indicated by message 1107e of FIG. 5). The fifth access request may also be referred to as a fourth retransmission of the access request for the access attempt. More particularly, mobile station processor 201 transmits the fifth access request at time Td as shown in FIG. 2, with the fifth access request being a fifth packet channel request (e.g., an EPCR) message. After transmitting the fifth access request, mobile station processor 201 looks (e.g., monitors, searches, etc.) for an assignment message matching the fifth access request received from the base station subsystem BSS (through antenna 217 and transceiver 209) during the fifth response interval RI at block 1109 of FIG. 6 (also shown as block 1109e of FIG. 5). Moreover, the fifth access request includes an identifying bit sequence that is unique relative to other access requests transmitted by mobile station processor 201 during the access attempt. More particularly, the identifying bit sequence for the fifth access request is different than identifying bit sequences for any of the first, second, third, and fourth access requests.

If an assignment message matching the fifth access request (e.g., having an identifying bit sequence matching the identifying bit sequence of the fifth access request) is received by the mobile station processor 201 (through antenna 217 and transceiver 209) during the fifth response interval RI at blocks 1109/1109e, 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching the fifth access request is not received by the mobile station processor 201 (through antenna 217 and transceiver 209) before expiration of the fifth response interval RI at blocks 1109/1109e, 1111, and/or 1113, mobile station processor 201 continues to wait until expiration/completion of retransmission interval TI-5 at block 1115 of FIG. 6 (also shown at block 1115e of FIG. 5) before aborting the access attempt at block 119.

As discussed above with respect to FIG. 2, retransmission interval TI-5 can be defined by system parameters (e.g., S and T), and retransmission interval TI-5 is longer than response interval RI. Accordingly, mobile station power consumption and/or processing overhead may be reduced and/or mobile station battery life may be increased by terminating looking (e.g., monitoring, searching, etc.) for an assignment message matching the fifth access request after expiration of response interval RI. Accordingly, mobile station processor 201 will wait at block 1115 of FIG. 6 (also indicated by block 1115e of FIG. 5) without monitoring for an assignment message matching the fifth access request (or any of the previous four access requests) between expiration of the fifth response interval RI and aborting the access attempt after expiration of retransmission interval TI-5.

Because the first, second, third, fourth, and fifth access requests include different identifying bit sequences, mobile station processor 201 can look (e.g., monitor, search, etc.) for an assignment message matching only the fifth access request during the fifth response interval RI (e.g., at block 1109e of FIG. 5) without monitoring for an assignment message matching any of the first, second, third, or fourth access requests.

Operations of blocks 1107, 1109, 1111, 1113, and 1115 are thus be repeated for a same access attempt until a maximum number of access requests have been transmitted/retransmitted, and the maximum number of access requests can be defined by the system parameter M that is broadcast by the base station subsystem BBS. According to some embodiments disclosed herein, up to five access requests (or four retransmissions) can be allowed at block 1117 before aborting an access attempt, but fewer or more access requests may be allowed, for example, depending on system parameters broadcast by base station subsystem BSS. According to some embodiments disclosed herein, the response interval RI for each access request of an access attempt can have a same duration as shown in FIG. 2.

As described in GP-130489 entitled "Energy Efficient AGCH Monitoring" (3GPP TSG GERAN#58, Xiamen, China, May 13-17, 2013), the disclosure of which is hereby incorporated herein in its entirety by reference, a mobile station MS that uses an Optimized/Improved Matching Procedure (OMP) during system access may experience significant power savings compared to a MS that uses a Legacy Matching Procedure (LMP) by taking advantage of new system information (SI) indicating response time window (RTW) parameters. According to some embodiments disclosed herein, OMP RTW parameters sent in SI may indicate:
  a point in time at which an MS should begin looking for a matching AGCH response (i.e., a lower edge $T_{LE}$ of the RTW) after sending an access request at time $t=t_0$ where $t_0$ may occur at Ti, Ta, Tb, Tc or Td of FIG. 9.
  a maximum amount of time an MS should continue looking for a matching AGCH response (i.e., an upper edge $T_{UE}$ of the RTW).

In the interest of maximizing/increasing MS power savings, a BSS can reduce the RTW (e.g., keeping the RTW as small as possible) while still allowing for variations in system access load that typically may not require any adjustment to RTW parameters. However, adjustments to RTW parameters may still be needed to reflect various operational scenarios such as when a given cell experiences sustained increases in system access traffic. As such, a mechanism may still be needed whereby a base station subsystem BSS 100 can adjust the RTW parameters while allowing the MS to remain operational (e.g., fully operational) prior to actually acquiring the new RTW parameters.

Figure 8:
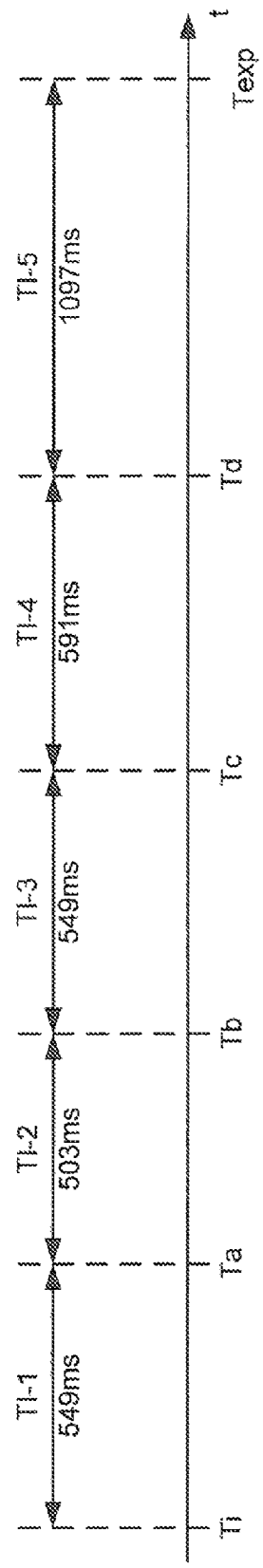
FIGS. 8 and 9 are a timing diagrams illustrating retransmission intervals according to some embodiments.

A response time window (RTW) used by some mobile stations MSs may be managed as illustrated in FIG. 8 and as discussed below:
  An MS starts looking for a matching AGCH response as soon as it completes the transmission of an access request on the RACH at times Ti, Ta, Tb, Tc, and/or Td.
  A number of slots belonging to the mobile station's Random Access Channel RACH between two successive access request messages is a value drawn randomly for each new access request transmission with uniform probability distribution in the set {S, S+1, . . . , S+T−1}. Note that the "number of slots" effectively means a "number of TDMA frames," since even for a multiple Common Control Channel CCCH configuration, a mobile station will only have access to 1 RACH slot per Time Division Multiple Access (TDMA) frame.
  When considering the parameter values provided in Table 5 of TR 43.868 (GERAN Improvements for Machine-type Communications), TX-integer (T)=20 and S=109. These values may result in the response windows shown in FIG. 8 (e.g., the first response window starts at t=Ti and ends at t=Ta, the second response window starts at t=Ta and ends at t=Tb, the third response window starts at t=Tb and ends at t=Tc, the fourth response window starts at t=Tc and ends at t=Td, and the fifth response window starts at t=Td and ends at t=Texp).
  These S and T values may allow a RACH spacing between two consecutive access requests to be 109 time slots=502 ms. However, since a legacy MS will look for a response matching any of its last 3 transmitted access request messages, this may translate into an effective response window of about 1.5 sec when looking for responses other than access request M+1.
  T3146 (defined in TS 44.018) determines the response window for the case where the MS sends access request M+1 and is set to (T+2S) TDMA frames (1 TDMA frame=4.61 ms) up to a maximum of 5 seconds. As such, using the parameters from Table 5 of TR 43.868, this may translate into an effective response window of about 2 seconds when looking for a response to access request M−1, M and M+1.

In FIG. 8, Ti=time at which the initial access request is transmitted; Ta=time at which the $2^{nd}$ access request is transmitted; Tb=time at which the $3^{rd}$ access request is transmitted; Tc=time at which the $4^{th}$ access request is transmitted; and Td=time at which the $5^{th}$ (and final) access request is transmitted.

Figure 9:
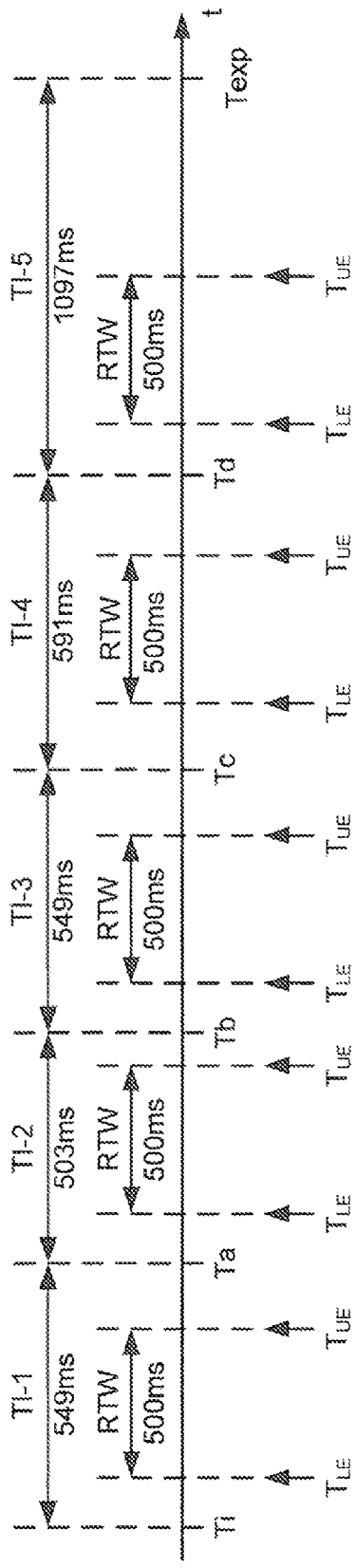

The response time window (RTW) used by an OMP capable MS may be a subset of a time interval used by a legacy mobile station when searching for a response to an access request (i.e., the time interval spanned by $T_{LE}$ and $T_{UE}$ in FIG. 9). As shown in FIG. 9, each response time window RTW may begin at a time $T_{LE}$ (defining a lower edge or beginning of the RTW) and may end at a time $T_{UE}$ (defining an upper edge or end of the RTW). The RTW used in conjunction with the OMP feature may be managed as follows:
  An OMP capable BSS may include an OMP Status bit (also referred to as an RTW reduction status bit) in all RR (Radio Resource) messages sent on the Access Grant Channel and/or Paging Channel AGCH/PCH (i.e., using the same/similar messages as where Implicit Reject bits are sent) and thereby indicate whether the RTW reduction or OMP RTW (OMP Status bit 'enabled') or the RTW non-reduction or legacy RTW (OMP Status bit 'disabled') is to be used during system access.

As such, prior to sending any of the up to M+1 access requests for a given access attempt, an OMP capable MS will read the OMP Status bit to determine which RTW (i.e., the OMP/reduced RTW or the legacy/non-reduced RTW) to use when searching for a matching response message.

The OMP RTW parameters may be included in the SI 23 message and any changes to the OMP RTW parameters may result in the SI_CHANGE_FIELD of the SI 13 Rest Octets IE (Information Element) indicating a change to the SI 23 message specifically due to a change in the OMP RTW parameters. This may allow mobile stations supporting network sharing but not the OMP feature (and vice versa) to avoid reading SI 23 information unnecessarily.

An OMP capable BSS may at any time set the OMP Status bit to 'disabled' for an implementation specific period of time during which it will force all OMP capable mobile stations MSs to use the legacy/non-reduced RTW. While doing so, the BSS may decide to (a) keep the OMP RTW parameters sent in SI 23 unchanged (e.g., a transient condition triggered the OMP feature to be disabled) or to (b) modify the OMP RTW parameters sent in SI (e.g., a sustained condition triggered the OMP feature to be disabled) in which case the BSS shall use the SI_CHANGE_FIELD to signal a change in OMP RTW parameters.

An OMP capable BSS may also use the SI_CHANGE_FIELD to indicate a change in OMP RTW parameters without simultaneously setting the OMP Status bit to 'disabled' for the case where the OMP RTW parameters are adjusted to indicate a RTW that is a subset of the previous RTW (i.e., a later lower edge $T_{LE}$ and/or an earlier upper edge $T_{UE}$). However, for the case where the OMP RTW parameters are adjusted to indicate a RTW that is larger than the previous RTW (i.e., an earlier lower edge $T_{LE}$ and/or a later upper edge $T_{UE}$) the period of time for which the BSS keeps the OMP Status bit set to 'disabled' may be implementation specific but should at least be equal to the nominal SI refresh interval of 30 seconds.

This approach to OMP RTW management may give the BSS real time control over whether the legacy/non-reduced RTW or the OMP/reduced RTW is to be used by OMP capable mobile stations for both (a) transient conditions that require no change to the OMP RTW parameters and (b) sustained conditions that require mobile stations to re-read/change the OMP RTW parameters.

It should be noted that a need to change the OMP RTW parameters is not expected to occur very often in which case no changes to the SI_CHANGE_FIELD in the SI 13 Rest Octets IE may be feasible. This would mean that an OMP capable MS may need to determine when to re-read the OMP RTW parameters from SI 23 messages other than at power on or cell change. In the absence of SI_CHANGE_FIELD based notifications of when an MS is to re-read the OMP RTW parameters, some methods whereby an OMP capable MS can conclude that it should re-read the OMP RTW parameters may include (a) detecting a substantial increase in the typical number of access requests it sends before detecting a matching response and/or (b) determining that the OMP Status bit has been set to 'disabled' for an extended period of time (e.g., 1 minute) and/or (c) failing to detect a matching response after sending the maximum allowed number of access requests (i.e., M+1).

In FIG. 9, $T_{LE}$=the lower edge of the response time window, and $T_{UE}$=the upper edge of the response time window.

Power Savings for Small Data Transmissions

The case of a small data transmission (SDT) is considered to determine if OMP power savings represent a significant portion of total power consumed during an SDT. A specific example of an SDT considered is as follows:

A mobile station has 660 octets of payload to transmit which (assuming CS-1 coding is used) may require the transmission of 30 RLC (Radio Link Control) data blocks.

RTW information sent using SI indicates a lower edge $T_{LE}$ of 75 ms and an upper edge $T_{UE}$ of 200 ms where an MS detects a matching response 100 ms after transmitting an access request on the RACH (see Annex A, provided below, for detailed calculations).

The total power consumed in an MS sending 30 CS-1 (coding scheme 1) coded RLC (Radio Link Protocol) data blocks=471.38 mWs (including power consumed monitoring downlink DL Packet Assisted Control Channel PACCH and reading Uplink Status Flag USF while sending the 30 RLC data blocks on the uplink UL temporary block flow TBF).

It is assumed that sending the same amount of user plane payload using fewer radio blocks will scale down the power consumption in a linear manner. For example, using modulation and coding scheme MCS-7 will require 6 RLC data blocks and therefore 80% less power will be consumed (0.2*471.38=94.28 mWs).

The power consumed by a mobile station when sending a single 11 bit RACH burst is about 0.12 mWs and is therefore negligible compared to the actual power consumed when sending the RLC data blocks containing the SDT payload.

Tables 1 and 2 of FIGS. 13A and 13B provide power savings information for an example where the Response Time Window is 125 ms (i.e., 200 ms−75 ms) and 250 ms (i.e., 300 ms−50 ms) respectively for an MS using CS-1 (coding scheme 1) coding or MCS-7 (modulation and coding scheme 7) coding. An observation to make from Tables 1 and 2 is that the power saved for a SDT performed using OMP may be significant compared to a total amount of power consumed during a SDT performed using LMP, and therefore, OMP may provide meaningful power savings.

Impact on SI 13

The SI_CHANGE_FIELD of the SI 13 Rest Octets IE may be modified so that the code point value 10 (previously unused) now indicates a change of SI 23 due to modification of the OMP RTW parameters sent therein.

Impact on SI 23

The SI 23 Rest Octets IE may be modified to include OMP RTW parameters. In the absence of this information in SI 23, an OMP capable MS may assume that OMP is disabled and may therefore perform system access using LMP. OMP RTW parameters may include an RTW_Low field and a RTW_High field added to the SI 23 Rest Octets IE as follows:

```
< SI 23 Rest Octets > ::=
< SI 23__3G__BA__IND : bit (1) >
< SI 23__CHANGE__MARK : bit (2) >
< SI 23__INDEX : bit (3) >
< SI 23__COUNT : bit (3) >
{ 0 | 1    < IRAT Cell Reselection Information :
            < IRAT Cell Reselection Information struct >> }
{           null | L -- Receiver backward compatible with earlier version
            | H -- Additions in Rel-12
                < RTW__Low : bit (2) >
                < RTW__High : bit (2) >
}           -- End of additions for Rel-12
< spare padding > ;
• RTW__Low:   00 = lower edge of RTW is 50ms
              01 = lower edge of RTW is 75ms
              10 = lower edge of RTW is 100ms
              11 = lower edge of RTW is 150ms
• RTW__High:  00 = upper edge of RTW = RTW__Low + 50ms
              01 = upper edge of RTW = RTW__Low + 100ms
              10 = upper edge of RTW = RTW__Low + 200ms
              11 = upper edge of RTW = RTW__Low + 400ms
```

Impact on Downlink RR Messages

The network may include an OMP Status bit within an IMMEDIATE ASSIGNMENT message using the IA Rest Octets IE (see sub-clause 10.5.2.16) or within an IMMEDIATE ASSIGNMENT REJECT or an IMMEDIATE ASSIGNMENT EXTENDED or an IMMEDIATE PACKET ASSIGNMENT message using the Feature Indicator IE (see sub-clause 10.5.2.76) or within a PAGING REQUEST TYPE 1 message using the P1 Rest Octets IE (see sub-clause 10.5.2.23) or within a PAGING REQUEST TYPE 2 message using the P2 Rest Octets IE (see sub-clause 10.5.2.24) or within a PAGING REQUEST TYPE 3 message using the P3 Rest Octets IE (see sub-clause 10.5.2.25).

Impact on System Access Procedures

The 'RR connection establishment initiated by the mobile station' procedure (see sub-clause 3.3.1) and the 'Packet access procedure using CCCH' procedure (see sub-clause 3.5.2) may both be updated to describe how an OMP capable MS reads the OMP Status bit in downlink RR messages before transmitting an access request message during any given access attempt. The mobile station uses this information to determine whether to use the OMP RTW or the legacy RTW when searching for a response to its last transmitted access request.

Considering the substantial power savings that may be realized using OMP based system access procedures (see, GP-130489 entitled "Energy Efficient AGCH Monitoring", and Tables 1 and 2 of FIGS. 13A and 13B), 44.018 may be enhanced to support the OMP feature by making modifications described above with respect to FIGS. 8 and 9.

Figure 10A:
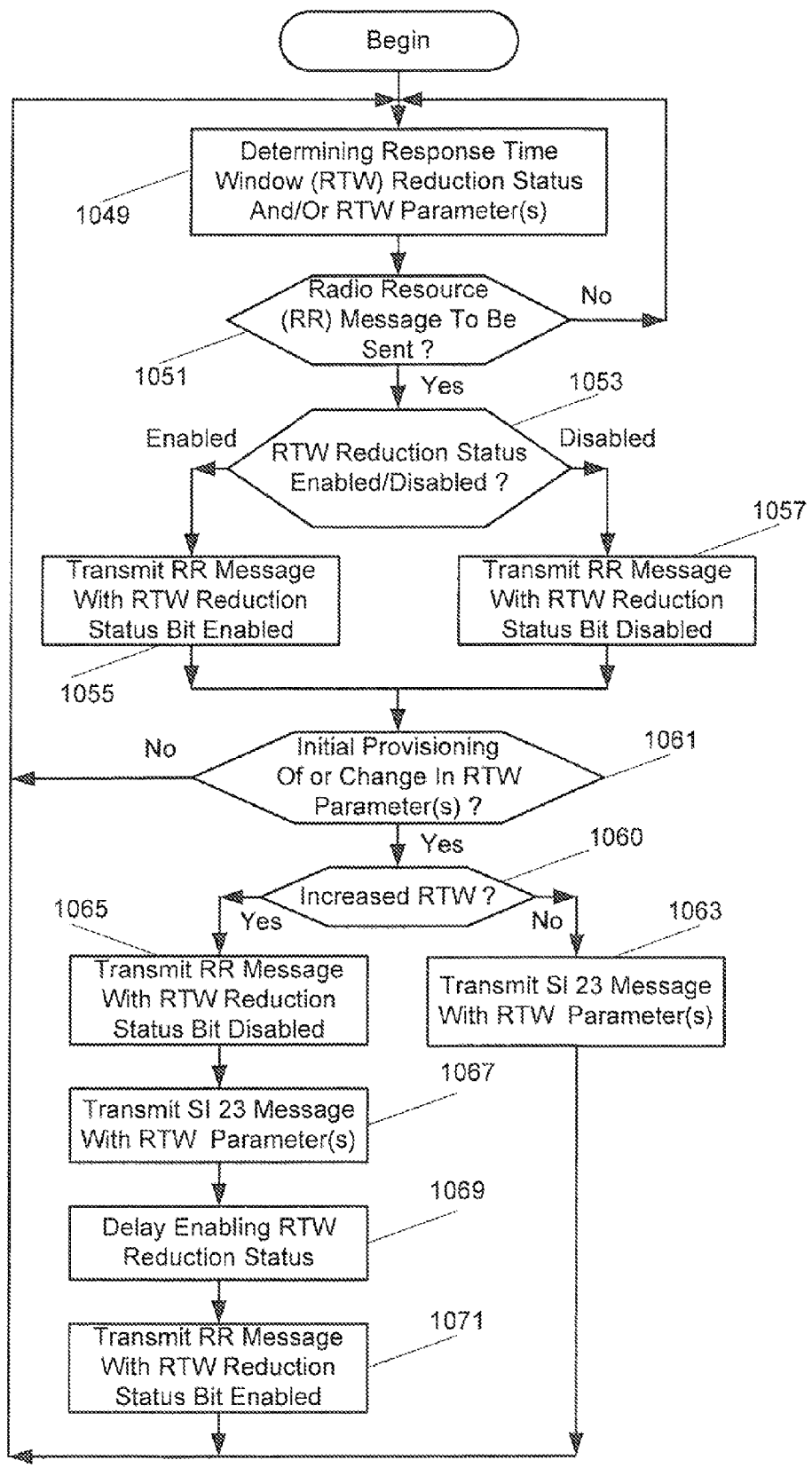

FIGS. 10A and 10B are flow charts illustrating operations of base station subsystem BSS 100 communicating with a mobile station MS 200 according to some embodiments. At block 1049, BSS processor 101 determines a response time window (RTW) within which an assignment message will be transmitted responsive to an access request received from mobile station 200. BSS processor 101, for example, may determine RTW parameters including a delay before initiation of a response time window at time $T_{LE}$, and a duration of the response time window between times $T_{LE}$ and $T_{UE}$. In addition, processor 101 may determine an RTW reduction status (i.e., either enabled or disabled). As discussed above, RTW parameters may be transmitted relatively infrequently using SI 23 messages, and the RTW reduction status may be transmitted in real time as a status bit in Radio Resource RR messages. Accordingly, mobile station 200 may be instructed to enable/disable RTW reduction in real time. As indicated by the logical loops of FIG. 10A, BSS processor 101 may reevaluate RTW parameters and/or RTW reduction status at any time.

Each time an RR message is to be sent by BSS at block 1051, BSS processor 101 may determine whether RTW reduction status is currently enabled/disabled at block 1053. If RTW reduction status is currently enabled at block 1053 (so that RTW reduction is used, also referred to as OPM RTW), BSS processor 101 transmits RR messages with the RTW reduction status bit enabled at block 1055. If RTW reduction status is currently disabled at block 1053 (so that RTW non-reduction is used, also referred to as legacy RTW), BSS processor 101 transmits RR messages with the RTW reduction status bit disabled at block 1057.

As long as there is no change in RTW parameters at block 1061, BSS processor 101 may repeat operations discussed above with respect to blocks 1049, 1051, 1053, 1055, 1057, and 1061. If there is a change in RTW parameters (e.g., as determined at block 1049), BSS processor 101 may proceed to block 1060. While not shown in FIG. 10A, BSS processor 101 may also periodically transmit SI 23 messages including the current RTW parameters. Accordingly, a mobile station 200 may receive current RTW parameters at some point after initiating service with BSS 100 before any change in RTW parameters occurs.

A change in RTW parameters will not increase the response time window if the new response time window is a subset of the previous response time window. Stated in other words, a new RTW defined by $Tn_{LE}$ and $Tn_{UE}$ is not increased relative to a previous RTW defined by $Tp_{LE}$ and $Tp_{UE}$ provided that $Tp_{LE} \le Tn_{LE} < Tp_{UE}$ and provided that $Tp_{LE} < Tn_{UE} \le Tp_{UE}$.

A change in RTW parameters will increase the response time window if the new response time window is not a subset of the previous response time window. Stated in other words, a new RTW defined by $Tn_{LE}$ and $Tn_{UE}$ is increased relative to a previous RTW defined by $Tp_{LE}$ and $Tp_{UE}$ provided that $Tn_{LE} < Tp_{LE}$ and/or $Tp_{UE} < Tn_{UE}$. Any reduction of $Tn_{LE}$ relative to $Tp_{LE}$ or any increase of $Tn_{UE}$ relative to $Tp_{UE}$ is thus considered an increase of RTW.

If there is no increase in a new RTW relative to a previous RTW at block 1060, BSS processor 101 may transmit (through BSS transceiver 109) response time parameters (e.g., $T_{LE}$ and $T_{UE}$) for the new RTW as elements of an SI 23 message at block 1063. Because the new RTW is a subset of the previous RTW, a mobile station can continue to look for assignment messages using the previous (broader) RTW during a transition period without missing assignment messages transmitted using the new (narrower) RTW. More particularly, the RTW parameters may include an indication of a delay interval (i.e., $T_{LE}$) provided between an access request received from a mobile station and a beginning of an RTW within which an assignment message will be transmitted responsive to the access request. The RTW parameters may also include an indication of an end/duration (i.e., $T_{UE}$) for the RTW within which an assignment message will be transmitted responsive to the access request.

If there is an increase in a new RTW relative to a previous RTW, however, a mobile station looking for assignment messages using the previous (narrower) RTW may miss assignment messages transmitted by BSS 100 using the new (broader) RTW during a transition period unless additional precautions are taken. For example, if there is an increase in a new RTW relative to a previous RTW at block 1060, BSS processor 101 may transmit an RR message with the RTW reduction status bit disabled at block 1065 before transmitting response time parameters (e.g., $T_{LE}$ and $T_{UE}$) for the new RTW as elements of an SI 23 message at block 1067. Because mobile stations receive the RR message with the RTW reduction status bit disabled in real time, any mobile station can immediately revert to legacy RTW operation (discussed above with respect to FIG. 8) for a transition period (defined by the delay of block 1069) so that the mobile station looks for assignment messages over the entirety of transmission intervals TI-1, TI-2, TI-3, TI-4, and/or TI-5 during the transition period. Even though the new RTW parameters may not reach the mobile stations in real time, BSS processor 101 can initiate transmission of assignment messages using the new RTW during the transition period because the mobile stations can revert to legacy RTW operation in real time.

At block 1067, BSS processor 101 may transmit (through BSS transceiver 109) RTW parameters (e.g., $T_{LE}$ and $T_{UE}$) for the new RTW as elements of an SI 23 message. More particularly, the RTW parameters may include an indication of a delay interval (i.e., $T_{LE}$) provided between an access request received from a mobile station and a beginning of an RTW within which an assignment message will be transmitted responsive to the access request. The RTW parameters may also include an indication of an end/duration (i.e., $T_{UE}$) of the RTW within which an assignment message will be transmitted responsive to the access request.

After transmitting the SI 23 message at block 1067, BSS processor 101 may delay enabling RTW reduction status at mobile station 200 during the transition period at block 1069 before transmitting an RR message with the RTW reduction status bit enabled at block 1071. Once mobile station 200 receives the RR message with the reduction status bit enabled, mobile station 200 may look for assignment messages using the new RTW based on the RTW parameters transmitted at block 1067.

RTW reduction status (i.e., enabled or disabled) may thus be transmitted in real time using RR messages at blocks 1055 and/or 1057, and RTW parameters can be transmitted less frequently at blocks 1067 and/or 1063.

As shown in FIG. 10B, when an access request is received at BSS processor 101 through BSS transceiver 109 at block 1171, BSS processor 101 may transmit a matching assignment message. If the RTW reduction status is currently enabled at block 1173, BSS processor 101 may transmit (1175) a matching assignment message using RTW reduction (in accordance with the current RTW parameters determined at block 1049 and transmitted at block 1063/1067).

If the RTW reduction status is currently disabled at block 1173, BSS processor 101 may transmit (1177) a matching assignment message without using RTW reduction (in accordance with the RTW reduction status determined at block 1049 and the RR message transmitted at block 1057 with the RTW reduction status bit disabled).

Figure 12B:
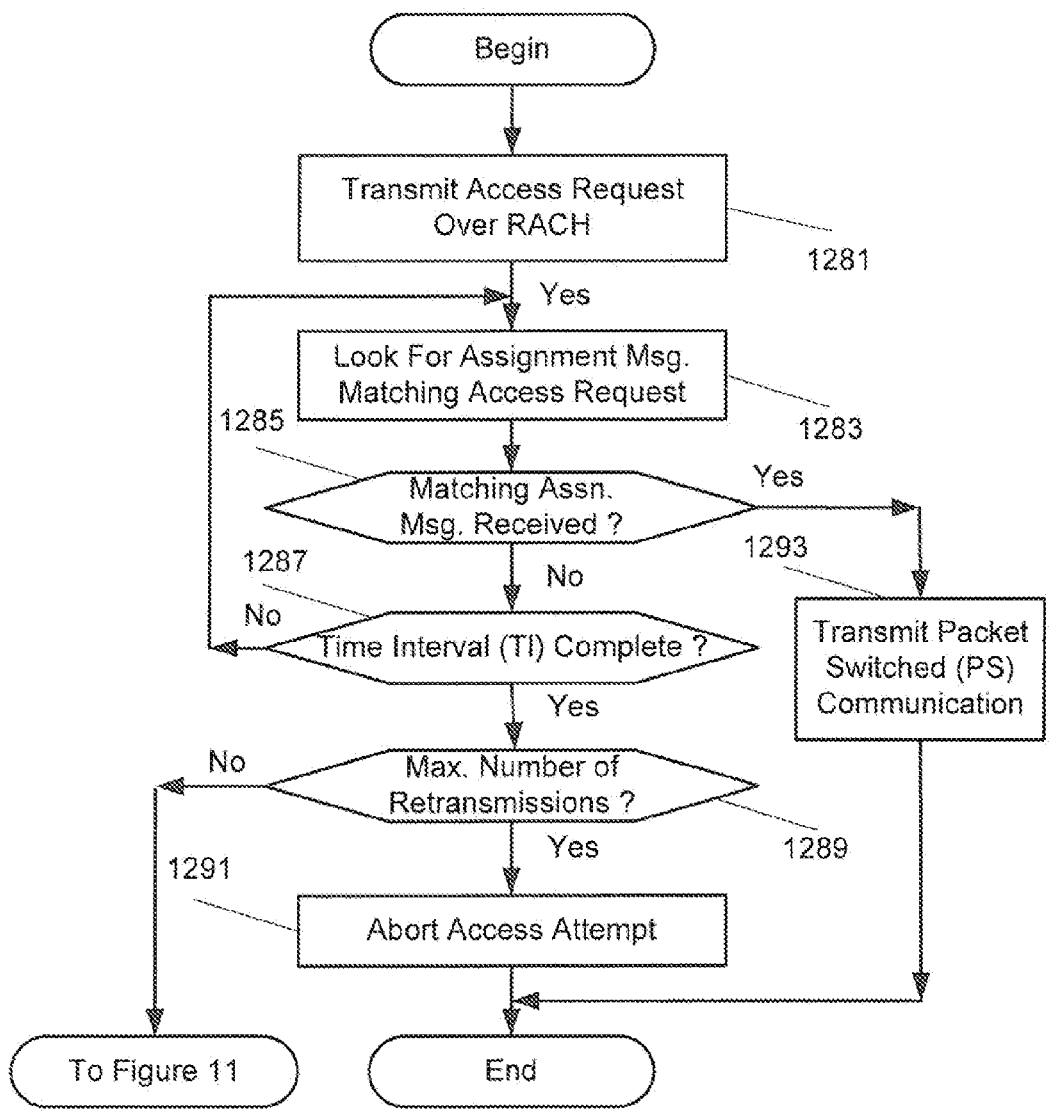

FIGS. 11, 12A, and 12B are flow charts illustrating operations of base station subsystem BSS 100 communicating with a mobile station MS 200 according to some embodiments. When mobile station 200 is serviced by BSS 100, MS 200 may receive RR messages including respective RTW reduction status bits (indicating that RTW reduction status is either enabled or disabled) and SI 23 messages including RTW parameters that are transmitted from BSS 100 as discussed above.

If an SI 23 message is received at block 1155 including RTW parameters, MS processor 201 may update the RTW parameters at block 1156. As discussed above with respect to FIG. 10A, BSS 100 may transmit SI 23 messages including RTW parameters when RTW parameters change, and/or BSS 100 may transmit SI 23 messages including RTW parameters periodically. As discussed above, an SI change field may be used to indicate SI 23 messages including RTW parameters so that MS processor 201 does not have to look for RTW parameters in every SI 23 message. According to other embodiments, MS processor 201 may read SI 23 messages to receive new RTW parameters responsive to: an average number of access requests required before receiving an assignment message exceeding a threshold; an increase in a number of access requests required before receiving a matching assignment message; detecting that RTW reduction status has been disabled for a period of time exceeding a threshold; and/or failure to receive an assignment message responsive to transmitting a maximum number of access requests for an access attempt.

Upon determining that an access attempt should be initiated at block 1157, MS processor 201 may determine at block 1158 if RTW parameters have been received. When MS 200 initially establishes service with BSS 100 (e.g., MS 200 is powered on, MS moves into a cell covered by BSS 100, etc.), MS may not receive RTW parameters until BSS 100 changes RTW parameters that are transmitted at blocks 1063/1067. Accordingly, MS 200 may not have current RTW parameters for BSS 100 for some period of time after initiating service with BSS 100. If MS processor 201 has not received any RTW parameters from BSS 100 at block 1158, there is no need to check RTW reduction status, and MS processor 201 may proceed with access attempt without RTW reduction at block 1165 and FIG. 12B.

If MS processor 201 has received current RTW parameters from BSS 100 at block 1158, MS processor receives an RR message including a current RTW reduction status (either enabled or disabled) at block 1151 and updates the RTW reduction status at block 1153. If no RTW reduction status is received at block 1151, MS processor 201 may set the last received RTW reduction status to disabled. If the RTW reduction status is enabled at block 1161, MS processor 201 may proceed with the access attempt using RTW reduction at block 1163 and FIG. 12A. If the RTW reduction status is disabled at block 1161, MS processor 201 may proceed with the access attempt without RTW reduction at block 1165 and FIG. 12B. An access attempt may thus begin with or without RTW reduction. RTW reduction status may change, however, for different access requests of the same access attempt.

If the RTW reduction status is enabled at block 1161, MS processor 201 may proceed with access request as discussed above with respect to FIG. 9. More particularly, MS processor 201 may transmit an initial access request of the access attempt (through transceiver 209) at time Ti to base station subsystem BSS 100 at block 1251, and delay looking for a response matching the access request according to the delay interval (from Ti to $T_{LE}$) defined by the RTW parameters at block 1253. At block 1254, MS processor 201 may initiate a response time window (RTW) after the delay interval, and at block 1255, MS processor 201 may look for an assignment message transmitted from the base station subsystem BSS 100 and matching the access request during the RTW without looking for an assignment message matching the access request during the delay interval before $T_{LE}$. Moreover, MS processor 201 may continue looking for an assignment message matching the access request until either a matching assignment message is received at block 1257 or the RTW is complete at block 1259. Accordingly, MS processor 201 does not look for an assignment message matching the access request after termination of the RTW at $T_{UE}$ at block 1260.

If an assignment message matching the initial access request is received during the RTW of interval TI-1 at block 1257, MS processor 201 may transmit a packet switched communication to BSS 100 at block 1267 in accordance with the assignment message. If an assignment message matching the initial access request is not received during the RTW of interval TI-1 at block 1257 and 1259, MS processor 201 terminates the RTW at block 1260 and waits for the end of time interval TI-1 at block 1261.

At block 1263, MS processor 201 determines if a maximum number of access requests have been transmitted/retransmitted for the access attempt, and if not, a next access request may be transmitted in accordance with blocks 1158, 1151, 1153, 1161, 1163, and/or 1165 and/or FIG. 12A and/or FIG. 12B. If a maximum number of access requests have been transmitted/retransmitted at block 1263, MS processor 201 may abort the access attempt at block 1265. Provided the RTW reduction status remains enabled at blocks 1151/1153 for each access request of the access attempt according to embodiments discussed above with respect to FIG. 9, up to five access requests may be transmitted (e.g., at Ti, Ta, Tb, Tc, and Td), and MS processor 201 may confine looking for respective assignment messages during respective response time windows RTWs of intervals TI-1, TI-2, TI-3, TI-4, and TI-5.

If the RTW reduction status is disabled at block 1161 or if current RTW parameters have not been received at block 1158, MS processor 201 may proceed with access request as discussed above with respect to FIG. 8. More particularly, MS processor 201 may transmit an initial access request of the access attempt (through transceiver 209) at time Ti to base station subsystem BSS 100 at block 1281 of FIG. 12B. At blocks 1283, 1285, and 1287, MS processor 201 may look for an assignment message transmitted from BSS 100 and matching the assignment request over the entire interval TI-1 (i.e., without RTW reduction). MS processor 201 may continue looking for an assignment message matching the access request until either a matching assignment message is received at block 1285 or interval TI-1 is complete at block 1287.

If an assignment message matching the initial access request is received during interval TI-1 at block 1285, MS processor 201 may transmit a packet switched communication to BSS 100 at block 1293 in accordance with the assignment message. If an assignment message matching the initial access request is not received during interval TI-1 at block 1285 and 1287, MS processor 201 determines if a maximum number of access requests have been transmitted/retransmitted for the access attempt at block 1289, and if not, a next access request may be transmitted in accordance with blocks 1158, 1151, 1153, 1161, 1163, and/or 1165 and/or FIG. 12A and/or FIG. 12B. If a maximum number of access requests have been transmitted/retransmitted at block 1289, MS processor 201 may abort the access attempt at block 1291. Provided the RTW reduction status remains disabled at blocks 1151/1153 and/or no RTW parameters have been received at block 1158 for each access request of the access attempt according to embodiments discussed above with respect to FIG. 8, up to five access requests may be transmitted (e.g., at Ti, Ta, Tb, Tc, and Td), and MS processor 201 may look for respective assignment messages during respective intervals TI-1, TI-2, TI-3, TI-4, and TI-5.

If a first access request of an access attempt is transmitted with RTW reduction in accordance with blocks 1158, 1151, 1153, 1161, and 1163 and FIG. 12A, all access requests of the access attempt will likely be transmitted with RTW reduction. Similarly, if a first access request of an access attempt is transmitted without RTW reduction in accordance with blocks 1158, 1151, 1153, 1161, and 1165 and FIG. 12B, all access requests of the access attempt will likely be transmitted without RTW reduction.

As discussed above, with respect to FIG. 10A, however, RTW reduction status may be enabled/disabled in real time during an access attempt so that one access request of the access attempt is transmitted with RTW reduction enabled (in accordance with FIG. 9) and another access request of the same access attempt is transmitted with RTW reduction disabled (in accordance with FIG. 8).

In block 1255 of FIG. 12A, MS processor 201 may look for an assignment message matching a respective access request of any of retransmission intervals TI-2, TI-3, TI-4, and/or TI-5 by looking for an assignment message matching the respective access request during the respective response time window without looking for an assignment message matching any of the preceding access requests of the access attempt. More particularly, each access request of an access attempt may include a respective bit sequence that is unique relative to bit sequences of any other access request of the access attempt. Accordingly, MS processor 201 may look for an assignment message matching a bit sequence matching that of the most recent access request without looking for assignment messages having bit sequences matching any other access requests of the access attempt.

From one access attempt to the next, RTW parameters may change based on receipt of RTW parameters at blocks 1155 and/or 1156.

Annex A—Detailed Power Consumption Calculations

RTW=125 ms (Lower Edge=75 ms, Upper Edge=200 ms):

When a matching response is detected, it is assumed to be received 100 ms after the most recently transmitted access request on the RACH.

For an OMP capable MS, a total number of non-BCCH blocks read (approximately) in the time interval containing the matching response=(25/235)*9=0.96 where the number of AGCH matching attempts is therefore 0.96*0.6=0.57 (i.e., 60% of the non-BCCH radio blocks contain an Immediate Assignment message).

The total power consumed by a MS after sending one access request (a RACH burst) and detecting a matching response 100 ms later (i.e., in the first 25 ms of the 125 ms RTW)=0.96*5.2+0.57*0.052=5.02 mWs.

The total power consumed by a MS that monitors an entire 125 ms RTW (within $TI_1$, $TI_2$, $TI_3$, $TI_4$ or $TI_5$) without finding a matching response is 4.78*5.2+2.87*0.052=25.06 mWs.

For a LMP capable MS, the total number of non-BCCH blocks read (approximately) in the time interval containing the matching response=(100/235)*9=3.83 where the number of AGCH matching attempts is therefore 3.83*0.6=2.3 (i.e., 60% of the non-BCCH radio blocks contain an Immediate Assignment message).

The total power consumed by a MS after sending one access request (a RACH burst) and detecting a matching response 100 ms later=3.83*5.2+2.3*0.052=20.04 mWs.

The total power consumed by a MS that monitors an entire Time Interval is 109.8 mWs for $TI_1$, 100.0 mWs for $TI_2$, 111.2 for $TI_3$, 121.7 mWs for $TI_4$ and 222.3 mWs for $TI_5$ according to the example considered (e.g., as discussed above with respect to FIG. 8).

CS-1 Coded RLC Data Blocks:

For a match in Time interval 1 (TI1), the total power consumed using LMP=20.04 (first 100 ms of TI1)+

471.38 (transmission of 30 radio blocks)=491.42 mWs, whereas the total power consumed using OMP=5.02 (the last 25 ms of the first 100 ms of TI1)+ 471.38=476.61 mWs. This translates into a 3% power savings per SDT using OMP.

For a match in Time Interval 2 (TI2), the total power consumed using LMP=109.8 (all of TI1)+20.04 (first 100 ms of TI2)+471.38 (transmission of 30 radio blocks)=601.22 mWs, whereas the total power consumed using OMP=25.06 (125 ms of TI1)+5.02 (the last 25 ms of the first 100 ms of TI2)+471.38=501.67 mWs. This translates into a 16.6% power savings per SDT using OMP.

For a match in Time Interval 3 (TI3), the total power consumed using LMP=109.8 (all of TI1)+100.0 (all of TI2)+20.04 (first 100 ms of TI3)+471.38 (transmission of 30 radio blocks)=701.22 mWs, whereas the total power consumed using OMP=25.06 (125 ms of TI1)+ 25.06 (125 ms of TI2)+5.02 (the last 25 ms of the first 100 ms of TI3)+471.38=526.73 mWs. This translates into a 24.9% power savings per SDT using OMP.

For a match in Time Interval 4 (TI4), the total power consumed using LMP=109.8 (all of TI1)+100.0 (all of TI2)+111.2 (all of TI3)+20.04 (first 100 ms of TI4)+ 471.38 (transmission of 30 radio blocks)=812.42 mWs, whereas the total power consumed using OMP=25.06 (125 ms of TI1)+25.06 (125 ms of TI2)+25.06 (125 ms of TI3)+5.02 (the last 25 ms of the first 100 ms of TI4)+471.38=551.79 mWs. This translates into a 32.1% power savings per SDT using OMP.

For a match in Time Interval 5 (TI5), the total power consumed using LMP=109.8 (all of TI1)+100.0 (all of TI2)+111.2 (all of TI3)+121.7 (all of TI4)+20.04 (first 100 ms of TI5)+471.38 (transmission of 30 radio blocks)=934.12 mWs, whereas the total power consumed using OMP=25.06 (125 ms of TI1)+25.06 (125 ms of TI2)+25.06 (125 ms of TI3)+25.06 (125 ms of TI4)+5.02 (the last 25 ms of the first 100 ms of TI5)+471.38=576.85 mWs. This translates into a 38.2% power savings per SDT using OMP.

MCS-7 Coded RLC Data Blocks:

For a match in TI1, the total power consumed using LMP=20.04 (first 100 ms of TI1)+94.28=114.32 mWs, whereas the total power consumed using OMP=5.02 (the last 25 ms of the first 100 ms of TI1)+94.28=99.51 mWs. This translates into a 13.0% power savings per SDT using OMP.

For a match in TI2, the total power consumed using LMP=109.8 (all of TI1)+20.04 (first 100 ms of TI2)+ 94.28=224.12 mWs, whereas the total power consumed using OMP=25.06 (125 ms of TI1)+5.02 (the last 25 ms of the first 100 ms of TI2)+94.28=124.57 mWs. This translates into a 44.4% power savings per SDT using OMP.

For a match in TI3, the total power consumed using LMP=109.8 (all of TI1)+100.0 (all of TI2)+20.04 (first 100 ms of TI3)+94.28=324.12 mWs, whereas the total power consumed using OMP=25.06 (125 ms of TI1)+ 25.06 (125 ms of TI2)+5.02 (the last 25 ms of the first 100 ms of TI3)+94.28=149.63 mWs. This translates into a 53.8% power savings per SDT using OMP.

For a match in TI4, the total power consumed using LMP=109.8 (all of TI1)+100.0 (all of TI2)+111.2 (all of TI3)+20.04 (first 100 ms of TI4)+94.28=435.32 mWs, whereas the total power consumed using OMP=25.06 (125 ms of TI1)+25.06 (125 ms of TI2)+25.06 (125 ms of TI3)+5.02 (the last 25 ms of the first 100 ms of TI4)+94.28=174.69 mWs. This translates into a 59.9% power savings per SDT using OMP.

For a match in TI5, the total power consumed using LMP=109.8 (all of TI1)+100.0 (all of TI2)+111.2 (all of TI3)+121.7 (all of TI4)+20.04 (first 100 ms of TI5)+ 94.28=557.02 mWs, whereas the total power consumed using OMP=25.06 (125 ms of TI1)+25.06 (125 ms of TI2)+25.06 (125 ms of TI3)+25.06 (125 ms of TI4)+ 5.02 (the last 25 ms of the first 100 ms of TI5)+ 94.28=199.75 mWs. This translates into a 64.1% power savings per SDT using OMP.

RTW=250 ms (Lower Edge=50 ms, Upper Edge=300 ms):

When a matching response is detected, it is assumed to be received 100 ms after the most recently transmitted access request on the RACH.

For an OMP capable MS, the total number of non-BCCH blocks read (approximately) in the time interval containing the matching response=(50/235)*9=1.91 where the number of AGCH matching attempts is therefore 1.91*0.6=1.15 (i.e., 60% of the non-BCCH radio blocks contain an Immediate Assignment message).

The total power consumed by a MS after sending one access request (a RACH burst) and detecting a matching response 100 ms later (i.e., in the first 50 ms of the 250 ms RTW)=1.91*5.2+1.15*0.052=10.0 mWs.

The total power consumed by a MS that monitors the entire 250 ms RTW (within $TI_1$, $TI_2$, $TI_3$, $TI_4$ or $TI_5$) without finding a matching response is 9.57*5.2+ 5.74*0.052=50.06 mWs.

For a LMP capable MS, the total number of non-BCCH blocks read (approximately) in the time interval containing the matching response=(100/235)*9=3.83 where the number of AGCH matching attempts is therefore 3.83*0.6=2.3 (i.e., 60% of the non-BCCH radio blocks contain an Immediate Assignment message).

The total power consumed by a MS after sending one access request (a RACH burst) and detecting a matching response 100 ms later=3.83*5.2+2.3*0.052=20.04 mWs.

The total power consumed by a MS that monitors an entire Time Interval is 109.8 mWs for TI1, 100.0 mWs for TI2, 111.2 for TI3, 121.7 mWs for TI4 and 222.3 mWs for TI5 according to the example considered (e.g., as discussed above with respect to FIG. 8).

CS-1 Coded RLC Data Blocks:

For a match in Time Interval 1 (TI1), the total power consumed using LMP=20.04 (first 100 ms of TI1)+ 471.38 (transmission of 30 radio blocks)=491.42 mWs, whereas the total power consumed using OMP=10.0 (the last 50 ms of the first 100 ms of TI1)+ 471.38=481.38 mWs. This translates into a 2% power savings per SDT using OMP.

For a match in Time Interval 2 (TI2), the total power consumed using LMP=109.8 (all of TI1)+20.04 (first 100 ms of TI2)+471.38 (transmission of 30 radio blocks)=601.22 mWs, whereas the total power consumed using OMP=50.06 (250 ms of TI1)+10.0 (the last 50 ms of the first 100 ms of TI2)+471.38=531.44 mWs. This translates into an 11.6% power savings per SDT using OMP.

For a match in Time Interval 3 (TI3), the total power consumed using LMP=109.8 (all of TI1)+100.0 (all of TI2)+20.04 (first 100 ms of TI3)+471.38 (transmission of 30 radio blocks)=701.22 mWs, whereas the total power consumed using OMP=50.06 (250 ms of TI1)+ 50.06 (250 ms of TI2)+10.0 (the last 50 ms of the first 100 ms of TI3)+471.38=581.5 mWs. This translates into a 17.1% power savings per SDT using OMP.

For a match in Time Interval 4 (TI4), the total power consumed using LMP=109.8 (all of TI1)+100.0 (all of TI2)+111.2 (all of TI3)+20.04 (first 100 ms of TI4)+471.38 (transmission of 30 radio blocks)=812.42 mWs, whereas the total power consumed using OMP=50.06 (250 ms of TI1)+50.06 (250 ms of TI2)+50.06 (250 ms of TI3)+10.0 (the last 50 ms of the first 100 ms of TI4)+471.38=631.56 mWs. This translates into a 22.3% power savings per SDT using OMP.

For a match in Time Interval 5 (TI5), the total power consumed using LMP=109.8 (all of TI1)+100.0 (all of TI2)+111.2 (all of TI3)+121.7 (all of TI4)+20.04 (first 100 ms of TI5)+471.38 (transmission of 30 radio blocks)=934.12 mWs, whereas the total power consumed using OMP=50.06 (250 ms of TI1)+50.06 (250 ms of TI2)+50.06 (250 ms of TI3)+50.06 (250 ms of TI4)+10.0 (the last 50 ms of the first 100 ms of TI5)+471.38=681.62 mWs. This translates into a 27.0% power savings per SDT using OMP.

MCS-7 Coded RLC Data Blocks:

For a match in TI1, the total power consumed using LMP=20.04 (first 100 ms of TI1)+94.28=114.32 mWs whereas the total power consumed using OMP=10.0 (the last 50 ms of the first 100 ms of TI1)+94.28=104.28 mWs. This translates into an 8.8% power savings per SDT using OMP.

For a match in TI2, the total power consumed using LMP=109.8 (all of TI1)+20.04 (first 100 ms of TI2)+94.28=224.12 mWs, whereas the total power consumed using OMP=50.06 (250 ms of TI1)+10.0 (the last 50 ms of the first 100 ms of TI2)+94.28=154.34 mWs. This translates into a 31.1% power savings per SDT using OMP.

For a match in TI3, the total power consumed using LMP=109.8 (all of TI1)+100.0 (all of TI2)+20.04 (first 100 ms of TI3)+94.28=324.12 mWs, whereas the total power consumed using OMP=50.06 (250 ms of TI1)+50.06 (250 ms of TI2)+10.0 (the last 50 ms of the first 100 ms of TI3)+94.28=204.40 mWs. This translates into a 36.9% power savings per SDT using OMP.

For a match in TI4, the total power consumed using LMP=109.8 (all of TI1)+100.0 (all of TI2)+111.2 (all of TI3)+20.04 (first 100 ms of TI4)+94.28=435.32 mWs, whereas the total power consumed using OMP=50.06 (250 ms of TI1)+50.06 (250 ms of TI2)+50.06 (250 ms of TI3)+10.0 (the last 50 ms of the first 100 ms of TI4)+94.28=254.46 mWs. This translates into a 41.6% power savings per SDT using OMP.

For a match in TI5, the total power consumed using LMP=109.8 (all of TI1)+100.0 (all of TI2)+111.2 (all of TI3)+121.7 (all of TI4)+20.04 (first 100 ms of TI5)+94.28=557.02 mWs, whereas the total power consumed using OMP=50.06 (250 ms of TI1)+50.06 (250 ms of TI2)+50.06 (250 ms of TI3)+50.06 (250 ms of TI4)+10.0 (the last 50 ms of the first 100 ms of TI5)+94.28=304.52 mWs. This translates into a 45.3% power savings per SDT using OMP.

Further Definitions

In the above-description of various embodiments of present inventive concepts, it is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions can be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions can also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium can include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions can also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts can be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks can occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts.

That which is claimed is:

1. A method of operating a mobile station requesting uplink access from a base station subsystem, the method comprising:
   transmitting an uplink access request from the mobile station over an uplink to the base station subsystem;
   delaying looking for a downlink response from the base station subsystem matching the uplink access request according to a delay interval after transmitting the uplink access request from the mobile station over the uplink to the base station subsystem;
   initiating a response time window (RTW) at the mobile station after the delay interval; and
   during the response time window, looking for an assignment message transmitted over a downlink from the base station subsystem and matching the uplink access request without looking for an assignment message matching the uplink access request during the delay interval after transmitting the uplink access request.

2. The method of claim 1, wherein the uplink access request is a first uplink access request of an access attempt, wherein the delay interval is a first delay interval, and wherein the response time window (RTW) is a first response time window (RTW), the method further comprising:
   transmitting a second uplink access request of the access attempt from the mobile station to the base station subsystem after expiration of a retransmission time interval (TI) after transmitting the first uplink access request;
   delaying looking for a downlink response from the base station subsystem matching the second uplink access request according to a second delay interval;
   initiating a second response time window (RTW) at the mobile station after the second delay interval; and
   during the second response time window, looking for an assignment message transmitted from the base station subsystem and matching the second uplink access request without looking for an assignment message matching the second uplink access request during the second delay interval.

3. The method of claim 2, wherein the retransmission time interval is a first retransmission time interval, the method further comprising:
   transmitting a third uplink access request of the access attempt from the mobile station to the base station subsystem after expiration of a second retransmission time interval (TI) after transmitting the second uplink access request;
   delaying looking for a downlink response from the base station subsystem matching the third uplink access request according to a third delay interval;
   initiating a third response time window (RTW) at the mobile station after the third delay interval; and
   during the third response time window, looking for an assignment message transmitted from the base station subsystem and matching the third uplink access request without looking for an assignment message matching the third uplink access request during the third delay interval.

4. The method of claim 3, wherein the first, second, and third delay intervals have a same duration, and wherein the first and second retransmission time intervals have different durations.

5. The method of claim 2, further comprising:
after initiating the first response time window, terminating the first response time window at the mobile station, wherein looking for an assignment message matching the first uplink access request comprises looking for an assignment message matching the first uplink access request during the first response time window without looking for an assignment message matching the first uplink access request after terminating the first response time window;
wherein transmitting the second uplink access request comprises transmitting the second uplink access request after terminating the first response time window.

6. The method of claim 2 wherein looking for an assignment message matching the second uplink access request comprises looking for an assignment message matching the second uplink access request during the second response time window without looking for an assignment message matching the first uplink access request during the second response time window.

7. The method of claim 2 wherein the first uplink access request includes a first bit sequence, wherein the second uplink access request includes a second bit sequence different than the first bit sequence, and wherein looking for an assignment message during the second response time window comprises looking for an assignment message matching the second bit sequence without looking for an assignment message matching the first bit sequence.

8. The method of claim 2 wherein transmitting the second uplink access request comprises transmitting the second uplink access request responsive to failure to receive an assignment message matching the first uplink access request during the first response time window.

9. The method of claim 3 wherein transmitting the third uplink access request comprises transmitting the third uplink access request responsive to failure to receive an assignment message matching the second uplink access request during the second response time window.

10. The method of claim 1 wherein the uplink access request is a first uplink access request, and wherein the response time window is a response time window of the first uplink access request, the method further comprising:
before transmitting the first uplink access request, receiving a first response time window reduction status from the base station subsystem, wherein the first response time window reduction status indicates that response time window reduction is enabled, and wherein the delay interval is provided responsive to the first response time window reduction status;
after transmitting the first uplink access request and initiating the response time window of the first uplink access request, receiving a second response time window reduction status from the base station subsystem, wherein the second response time window reduction status indicates that response time window reduction is disabled;
after receiving the second response time window reduction status, transmitting a second uplink access request from the mobile station to the base station subsystem; and
responsive to transmitting the second uplink access request and responsive to the second response time window reduction status indicating that response time window reduction is disabled, looking for an assignment message transmitted from the base station subsystem and matching the second uplink access request without delay after transmitting the second uplink access request.

11. The method of claim 1 further comprising:
receiving a response time window parameter from the base station subsystem before transmitting the uplink access request, wherein a duration of the delay interval between transmitting the uplink access request and initiating the response time window is based on the response time window parameter received from the base station subsystem before transmitting the uplink access request, wherein the delay interval is used to delay looking for the downlink response from the base station subsystem matching the uplink access request.

12. The method of claim 1 wherein transmitting the uplink access request comprises transmitting the uplink access request from the mobile station on a random access channel.

13. The method of claim 1 wherein the uplink access request comprises a packet channel request message.

14. The method of claim 1 further comprising:
receiving an assignment message from the base station subsystem matching the uplink access request during the response time window; and
transmitting a packet switched communication from the mobile station to the base station subsystem responsive to receiving the assignment message matching the uplink access request.

15. The method of claim 1 wherein the assignment message is an assignment message for an uplink resource.

16. A method of operating a base station subsystem communicating with a mobile station, the method comprising:
determining at the base station subsystem a response time window within which an assignment message will be transmitted from the base station subsystem to the mobile station responsive to an uplink access request received from the mobile station; and
transmitting a response time window parameter over a downlink from the base station subsystem to the mobile station, wherein the response time window parameter includes an indication of a delay interval provided between an uplink access request transmitted from the mobile station over an uplink and a beginning of the response time window within which an assignment message will be transmitted from the base station subsystem responsive to the uplink access request received from the mobile station.

17. The method of claim 16 wherein transmitting the response time window parameter comprises transmitting the response time window parameter as system information.

18. The method of claim 17 wherein transmitting the response time window parameter comprises transmitting the response time window parameter as system information on a broadcast control channel.

19. The method of claim 16 wherein an uplink access request is received from a mobile station on a random access channel.

20. The method of claim 16 further comprising:
transmitting a response time window reduction status from the base station subsystem, wherein the response time window reduction status indicates that response time window reduction is enabled;

after transmitting the response time window reduction status and after transmitting the response time window parameter, receiving an uplink access request from the mobile station; and transmitting an assignment message matching the uplink access request during a response time interval defined by the response time window, wherein the assignment message matching the uplink access request is transmitted from the base station subsystem.

21. The method of claim 20 wherein transmitting the assignment message comprises transmitting the assignment message matching the uplink access request after the delay interval.

22. The method of claim 20 wherein the response time window reduction status is a first response time window reduction status, wherein the uplink access request is a first uplink access request, wherein the assignment message is a first assignment message matching the first uplink access request, and wherein the first assignment message is transmitted with response time window reduction, the method further comprising:

after receiving the first uplink access request, transmitting a second response time window reduction status from the base station subsystem to the mobile station, wherein the second response time window reduction status indicates response time window reduction is disabled;

after transmitting the second response time window reduction status, receiving a second uplink access request from the mobile station; and responsive to receiving the second uplink access request, transmitting a second assignment message matching the second uplink access request without response time window reduction, wherein the second assignment message matching the second uplink access request is transmitted from the base station subsystem.

23. The method of claim 20 wherein the response time window reduction status is a first response time window reduction status, wherein the response time window is a first response time window, wherein the response time window parameter is a first response time window parameter, and wherein the indication of a delay interval is an indication of a first delay interval, the method further comprising:

determining a second response time window within which an assignment message will be transmitted;

responsive to the second response time window being greater than the first response time window, transmitting a second response time window reduction status, wherein the second response time window reduction status indicates that response time window reduction is disabled;

transmitting a second response time window parameter including an indication of a second delay interval provided between receiving an uplink access request and a beginning of the second response time window within which an assignment message will be transmitted;

delaying enabling response time window reduction status;

while keeping the response time widow reduction status disabled, transmitting assignment messages without RTW reduction responsive to subsequent uplink access requests; and after delaying enabling response time window reduction status, transmitting a third response time window reduction status, wherein the third response time window reduction status indicates that response time window reduction is enabled.

24. The method of claim 23 further comprising:

after transmitting the third response time window reduction status, receiving subsequent uplink access requests; and responsive to receiving the subsequent uplink access requests after transmitting the third response time window reduction status, transmitting subsequent assignment messages matching the respective subsequent uplink access requests using response time intervals defined by the second response time window parameter.

25. The method of claim 16 wherein the assignment message is an assignment message for an uplink resource.

26. A mobile station comprising:

a transceiver configured to provide wireless communication with a base station subsystem of a radio access network; and a processor coupled to the transceiver, wherein the processor is configured to transmit an uplink access request through the transceiver over an uplink to the base station subsystem, to delay looking for a downlink response from the base station subsystem matching the uplink access request according to a delay interval after transmitting the uplink access request from the mobile station over the uplink to the base station subsystem, to initiate a response time window (RTW) after the delay interval, and during the response time window, to look for an assignment message transmitted over a downlink from the base station subsystem and matching the uplink access request without looking for an assignment message matching the uplink access request during the delay interval after transmitting the uplink access request.

27. The mobile station of claim 26 wherein the assignment message is an assignment message for an uplink resource.

28. The mobile station of claim 26 wherein the processor is further configured to receive a response time window parameter from the base station subsystem before transmitting the uplink access request, wherein a duration of the delay interval between transmitting the uplink access request and initiating the response time window is based on the response time window parameter received from the base station subsystem before transmitting the uplink access request, wherein the delay interval is used to delay looking for the downlink response from the base station subsystem matching the uplink access request.

29. A base station subsystem in a radio access network, the base station subsystem comprising:

a transceiver configured to provide wireless communication with a mobile station; and a processor coupled to the transceiver, wherein the processor is configured to determine a response time window within which an assignment message will be transmitted through the transceiver to the mobile station responsive to an uplink access request received from the mobile station, and to transmit a response time window parameter through the transceiver over a downlink to the mobile station wherein the response time window parameter includes an indication of a delay interval provided between an uplink access request transmitted over an uplink from the mobile station and a beginning of the response time window within which an assignment message will be transmitted through the transceiver to the mobile station responsive to the uplink access request received from the mobile station.

30. The base station subsystem of claim 29 wherein the processor is further configured to transmit a response time window reduction status through the transceiver to the mobile station, wherein the response time window reduction status indicates that response time window reduction is enabled, to receive an uplink access request through the transceiver after transmitting the response time window reduction status, and to transmit an assignment message matching the uplink access request through the transceiver during a response time interval defined by the response time window.

31. The base station subsystem of claim 30 wherein the response time window reduction status is a first response time window reduction status, wherein the response time window is a first response time window, wherein the response time window parameter is a first response time window parameter, wherein the indication of a delay interval is an indication of a first delay interval, and wherein the processor is further configured to determine a second response time window within which an assignment message will be transmitted, to transmit a second response time window reduction status through the transceiver responsive to the second response time window being greater than the first response time window wherein the second response time window reduction status indicates that response time window reduction is disabled, to transmit through the transceiver a second response time window parameter including an indication of a second delay interval provided between receiving an uplink access request and a beginning of the second response time window within which an assignment message will be transmitted, to delay enabling response time window reduction status, to transmit assignment messages through the transceiver without response time window reduction responsive to subsequent uplink access requests while keeping the response time widow reduction status disabled, and to transmit a third response time window reduction status through the transceiver after delaying enabling response time window reduction status, wherein the third response time window reduction status indicates that response time window reduction is enabled.

32. The base station subsystem of claim 31 wherein the processor is further configured to receive subsequent uplink access requests through the transceiver after transmitting the third response time window reduction status, and to transmit through the transceiver subsequent assignment messages matching the respective subsequent uplink access requests using response time intervals defined by the second response time window parameter responsive to receiving the subsequent uplink access requests after transmitting the third response time window reduction status.

33. The mobile station of claim 29 wherein the assignment message is an assignment message for an uplink resource.

* * * * *